United States Patent
Sun et al.

(10) Patent No.: US 12,077,688 B2
(45) Date of Patent: Sep. 3, 2024

(54) ADHESIVE TAPE, DISPLAY APPARATUS AND METHOD FOR ASSEMBLING THE SAME

(71) Applicants: HEFEI BOE DISPLAY LIGHTING CO., LTD., Anhui (CN); BOE TECHNOLOGY GROUP CO., LTD., Beijing (CN)

(72) Inventors: Wenbo Sun, Beijing (CN); Qiping Zhang, Beijing (CN); Yun Li, Beijing (CN)

(73) Assignees: HEFEI BOE DISPLAY LIGHTING CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 452 days.

(21) Appl. No.: 17/419,584

(22) PCT Filed: Sep. 28, 2020

(86) PCT No.: PCT/CN2020/118417
§ 371 (c)(1),
(2) Date: Jun. 29, 2021

(87) PCT Pub. No.: WO2022/061893
PCT Pub. Date: Mar. 31, 2022

(65) Prior Publication Data
US 2022/0145134 A1 May 12, 2022

(51) Int. Cl.
C09J 7/22 (2018.01)
G02F 1/1333 (2006.01)

(52) U.S. Cl.
CPC .......... *C09J 7/22* (2018.01); *G02F 1/133308* (2013.01); *C09J 2203/318* (2013.01); *C09J 2301/21* (2020.08); *G02F 2202/28* (2013.01)

(58) Field of Classification Search
CPC .... C09J 2203/318; C09J 2301/21; C09J 7/22; C09J 2301/204; C09J 7/30; G02F 1/133308; G02F 2202/28; G02F 1/133317
See application file for complete search history.

(56) References Cited

U.S. PATENT DOCUMENTS 10,216,038 B2 * 2/2019 Liu ................ B29C 45/14344

* cited by examiner

*Primary Examiner* — Lawrence D Ferguson
(74) *Attorney, Agent, or Firm* — IP & T GROUP LLP

(57) ABSTRACT

An adhesive tape includes a first adhesive portion and a second adhesive portion that are arranged at an interval in a width direction thereof, and a first base and a second base. The first base includes a first surface and a second surface that are arranged opposite to each other in a thickness direction thereof. The first adhesive portion is adhered to the first surface of the first base. The second base has a first region and a second region that are distributed at an interval in the width direction of the adhesive tape. A portion of the second base located in the first region is lapped on the second surface of the first base. The second adhesive portion is adhered to a portion of the second base located in the second region, and is located at the same surface of the second base as the first base.

20 Claims, 18 Drawing Sheets

ADHESIVE TAPE, DISPLAY APPARATUS AND METHOD FOR ASSEMBLING THE SAME

CROSS-REFERENCE TO RELATED APPLICATION

This application is a national phase entry under 35 USC 371 of International Patent Application No. PCT/CN2020/118417 filed on Sep. 28, 2020, which is incorporated herein by reference in its entirety.

TECHNICAL FIELD

The present disclosure relates to the field of display technologies, and in particular, to an adhesive tape, a display apparatus and a method for assembling the same.

BACKGROUND

Light-shielding adhesive tapes are adhesive tapes commonly used in a backlight module, which play a role in fixing an optical sheet, and serve to shield light leaked from an edge position.

SUMMARY

In one aspect, an adhesive tape is provided. The adhesive tape includes a first base and a second base, and a first adhesive portion and a second adhesive portion that are arranged at an interval in a width direction of the adhesive tape. The first base includes a first surface and a second surface that are arranged opposite to each other in a thickness direction thereof, and the first adhesive portion is adhered to the first surface of the first base. The second base has a first region and a second region that are distributed at an interval in the width direction of the adhesive tape, and a portion of the second base located in the first region is lapped on the second surface of the first base. The second adhesive portion is adhered to a portion of the second base located in the second region, and is located at a same surface of the second base as the first base.

In some embodiments, an edge of the first adhesive portion is flush with an edge of the first base located at a same side.

In some embodiments, the second base covers a whole of the second surface of the first base, and an edge of the first base facing away from the second adhesive portion in the width direction of the adhesive tape is flush with an edge of the second base located at a same side.

In some embodiments, a distance between the first adhesive portion and the second adhesive portion is within a range from 0.5 mm to 1.0 mm in the width direction of the adhesive tape.

In some embodiments, the adhesive tape further includes a support layer. The support layer is disposed on a surface of the first adhesive portion facing away from the first base and a surface of the second adhesive portion facing away from the second base, and the first adhesive portion and the second adhesive portion are peelably adhered to the support layer.

In some embodiments, the adhesive tape further includes a protective layer. The protective layer is peelably adhered to a surface of the second base facing away from the second adhesive portion. The second base covers a portion of the second surface of the first base, the protective layer is extended to a region of the first base exposed by the second base.

In another aspect, a display apparatus is provided. The display apparatus includes a plastic frame, a backplate, at least one optical sheet, and the adhesive tape according to any one of the above embodiments. The plastic frame includes a support platform convexly disposed on a side wall of the plastic frame. The backplate includes a bottom plate and a side wall, the plastic frame and the bottom plate of the backplate enclose a cavity, and a surface of the support platform facing away from the bottom plate is a support surface. The at least one optical sheet is disposed in the cavity. The first adhesive portion is adhered to the support surface of the support platform, and the second adhesive portion is adhered to a surface of the at least one optical sheet facing away from the bottom plate. The second base and the support surface of the support platform have a first overlapping region therebetween.

In some embodiments, an edge of the first adhesive portion is flush with an edge of the first base located at a same side.

In some embodiments, the second base covers a whole of the first base, an edge of the first base facing the side wall of the plastic frame is flush with an edge of the second base facing the side wall of the plastic frame.

In some embodiments, the first adhesive portion is entirely located on the support surface of the support platform.

In some embodiments, the second adhesive portion is entirely located on the surface of the at least one optical sheet facing away from the bottom plate.

In some embodiments, the first base and the second base are both light-shielding bases.

In some embodiments, thicknesses of the first base and the second base are both within a range from 0.03 mm to 0.05 mm.

In some embodiments, an edge of the second base facing the side wall of the plastic frame and the side wall of the plastic frame have a first distance therebetween.

In some embodiments, the display apparatus further includes a display panel disposed above the support surface of the support platform, and the display panel has a display area. The second base is a light-shielding base. An orthogonal projection of an edge of the second base facing away from the side wall of the plastic frame on the display panel is located outside the display area, and the orthogonal projection of the edge of the second base facing away from the side wall of the plastic frame on the display panel and the display area have a second distance therebetween. The second distance is greater than or equal to 0.5 mm and less than or equal to 0.7 mm.

In another aspect, a display apparatus is provided. The display apparatus includes a plastic frame, a backplate, at least one optical sheet, and the adhesive tape according to any one of the above embodiments. The plastic frame includes a support platform convexly disposed on a side wall of the plastic frame. The backplate includes a bottom plate and a side wall, the plastic frame and the bottom plate of the backplate enclose a cavity, and a surface of the support platform facing away from the bottom plate is a support surface. The at least one optical sheet is disposed in the cavity. The first adhesive portion is adhered to a surface of the at least one optical sheet facing away from the bottom plate, and the second adhesive portion of the second adhesive tape is adhered to the support surface of the support platform. The second base and the surface of the at least one optical sheet facing away from the bottom plate have a second overlapping region therebetween.

In some embodiments, the display apparatus further includes a display panel, and the display panel is disposed above the support surface of the support platform and is contact with the portion of the second base lapped on the second surface of the first base facing away from the first adhesive portion.

The second base covers a whole of the first base, an edge of the first base facing away from the plastic frame is flush with an edge of the second base facing away from the plastic frame. The display apparatus further includes a display panel having a display area and a peripheral area disposed around the display area. The first base and the second base are both light-shielding bases, an orthogonal projection of an edge of the first base facing away from the side wall of the plastic frame on the display panel is located outside the display area, the orthogonal projection of the edge of the first base facing away from the side wall of the plastic frame on the display panel and the display area have a third distance therebetween, and the third distance is greater than or equal to 0.5 mm and less than or equal to 0.7 mm.

In yet another aspect, a method for assembling the display apparatus according to any one of the above embodiments is provided. The method includes:

assembling the plastic frame and the backplate to form the cavity; placing the at least one optical sheet in the cavity enclosed by the plastic frame and the bottom plate of the backplate; adhering the first adhesive portion to the support surface of the support platform; adhering the second adhesive portion to the surface of the at least one optical sheet facing away from the bottom plate; lapping the second base on the second surface of the first base facing away from the first adhesive portion; and forming the first overlapping region between the second base and the support surface of the support platform.

In yet another aspect, a method for assembling the display apparatus according to any one of the above embodiments is provided. The method includes:

assembling the plastic frame and the backplate to form the cavity; placing the at least one optical sheet in the cavity enclosed by the plastic frame and the bottom plate of the backplate; adhering the first adhesive portion to the surface of the at least one optical sheet facing away from the bottom plate; adhering the second adhesive portion to the support surface of the support platform; lapping the second base on the second surface of the first base facing away from the first adhesive portion; and forming the second overlapping region between the second base and the surface of the at least one optical sheet facing away from the bottom plate.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals to which the embodiments of the present disclosure relate.

DETAILED DESCRIPTION

Figure 1:
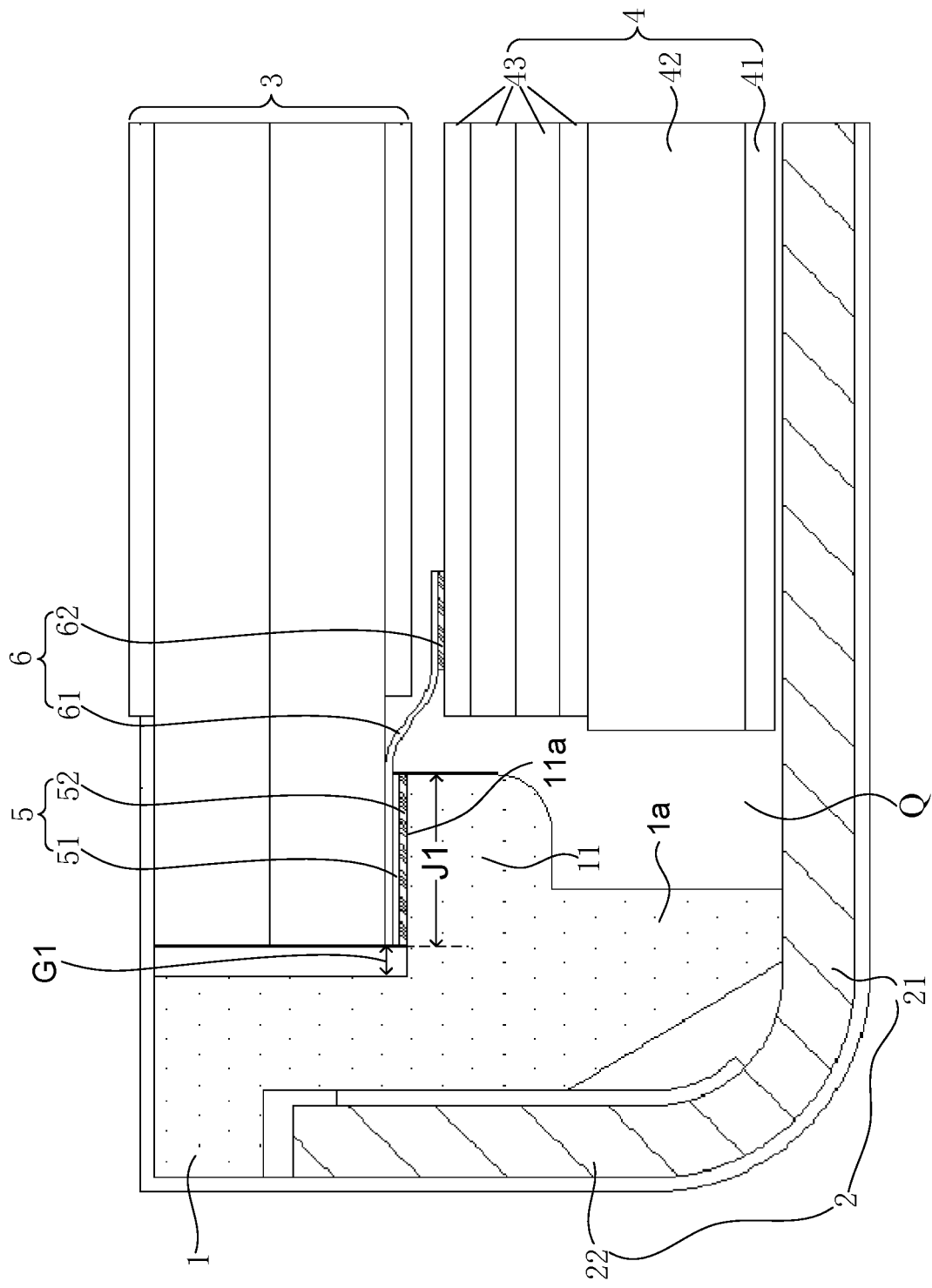
FIG. 1 is a sectional view showing a structure of a display apparatus in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the terms "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first", "second", and the like are only used for descriptive purposes, and are not to be construed as indicating or implying the relative importance or implicitly indicating the number of indicated technical features. Thus, features defined by "first", "second", and the like may explicitly or implicitly include one or more of the features. In the description of the embodiments of the present disclosure, "a plurality of/the plurality of" means two or more unless otherwise specified.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" means an open and inclusive expression, which does not exclude devices that are applicable to or configured to perform additional tasks or steps.

In addition, the use of the phrase "based on" means openness and inclusiveness, since processes, steps, calculations or other actions "based on" one or more of the stated conditions or values may, in practice, be based on additional conditions or values exceeding those stated.

The terms such as "about" or "approximately" as used herein include a stated value and an average value within an acceptable range of deviation of a particular value determined by a person of ordinary skill in the art, considering measurement in question and errors associated with measurement of a particular quantity (i.e., the limitations of a measurement system).

Exemplary embodiments are described herein with reference to sectional views and/or plan views as idealized exemplary drawings. In the accompanying drawings, thicknesses of layers and regions are enlarged for clarity. Thus, variations in shape with respect to the drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Some embodiments of the present disclosure provide a display apparatus, and as shown in FIG. 1, the display apparatus may include a plastic frame 1, a backplate 2, a display panel 3, a backlight module 4, a circuit board, a camera and other accessories. A support platform 11 is convexly provided on a side wall 1a of the plastic frame 1. The backplate 2 includes a bottom plate 21 and a side wall 22. The backplate 2 and the plastic frame 1 are assembled together to enclose a cavity Q, and the side wall 22 of the backplate 2 is located outside the side wall 1a of the plastic frame 1. The backlight module 4 and the display panel 3 are both located in the cavity Q. A surface of the support platform 11 facing away from the bottom plate 21 is a support surface 11a, and the display panel 3 is disposed above the support surface 11a of the support platform 11. The backlight module 4 is disposed at a side of the display panel 3 facing the bottom plate 21 and is configured to supply backlight to the display panel 3. The circuit board is coupled to the display panel 3 and is configured to supply electrical signals to the display panel 3 to control the display panel 3 to display an image.

The backlight module 4 may include a reflective sheet 41, a light guide plate 42 and at least one optical sheet 43. The light guide plate 42 is located below the at least one optical sheet 43, and the reflective sheet 41 is located below the light guide plate 42. In an example in which the at least one optical sheet 43 includes a lower diffusion sheet, a lower prism sheet, an upper prism sheet and an upper diffusion sheet in sequence from bottom to top, the light guide plate 42 is located below the at least one optical sheet 43, which means that the light guide plate 42 is located below the lower diffusion sheet.

The display apparatus may be a liquid crystal display apparatus. The liquid crystal display apparatus may be a mobile phone, a tablet computer, a notebook computer, a personal digital assistant (PDA) and a vehicle-mounted computer, etc.

In some embodiments, as shown in FIG. 1, the display apparatus further includes a first adhesive tape 5 and a second adhesive tape 6. The first adhesive tape 5 includes a first base 51 and a first adhesive portion 52 disposed on a surface of the first base 51, and the second adhesive tape 6 includes a second base 61 and a second adhesive portion 62 disposed on a surface of the second base 61. The first adhesive portion 52 of the first adhesive tape 5 is adhered to the support surface of the support platform 11, the second adhesive portion 62 of the second adhesive tape 6 is adhered to a surface of the at least one optical sheet 43 facing away from the bottom plate 21. The second base 61 is extended and lapped on a surface of the first base 51 facing away from the first adhesive portion 52, and the second base 61 and the support surface of the support platform 11 have a first overlapping region J1 therebetween.

The second adhesive portion 62 of the second adhesive tape 6 is adhered to the surface of the at least one optical sheet 43 facing away from the bottom plate 21, which means that the second adhesive portion 62 of the second adhesive tape 6 is adhered to a surface of an uppermost optical sheet 43 facing away from the bottom plate 21. Still in the example in which the at least one optical sheet 43 includes the lower diffusion sheet, the lower prism sheet, the upper prism sheet and the upper diffusion sheet in sequence from bottom to top, the second adhesive portion 62 of the second adhesive tape 6 is adhered to a surface of the upper diffusion sheet facing away from the bottom plate 21.

The second base 61 is extended and lapped on the surface of the first base 51 facing away from the first adhesive portion 52, which means that the second base 61 and the first base 51 are only in contact with each other, and have no physical or chemical connection relationship therebetween. The second base 61 and the support surface of the support platform 11 have the first overlapping region J1 therebetween, which means that a portion of the second base 61 is located above the support surface of the support platform 11 from a front view.

Since the first adhesive tape 5 and the second adhesive tape 6 play roles in fixing the optical sheet(s) 43 and shielding light leaked from an edge position, the first base 51 and the second base 61 may both be light-shielding bases. For example, the first base 51 and the second base 61 may be black PET (polyethylene terephthalate) films or silicon rubber pads.

Figure 2:
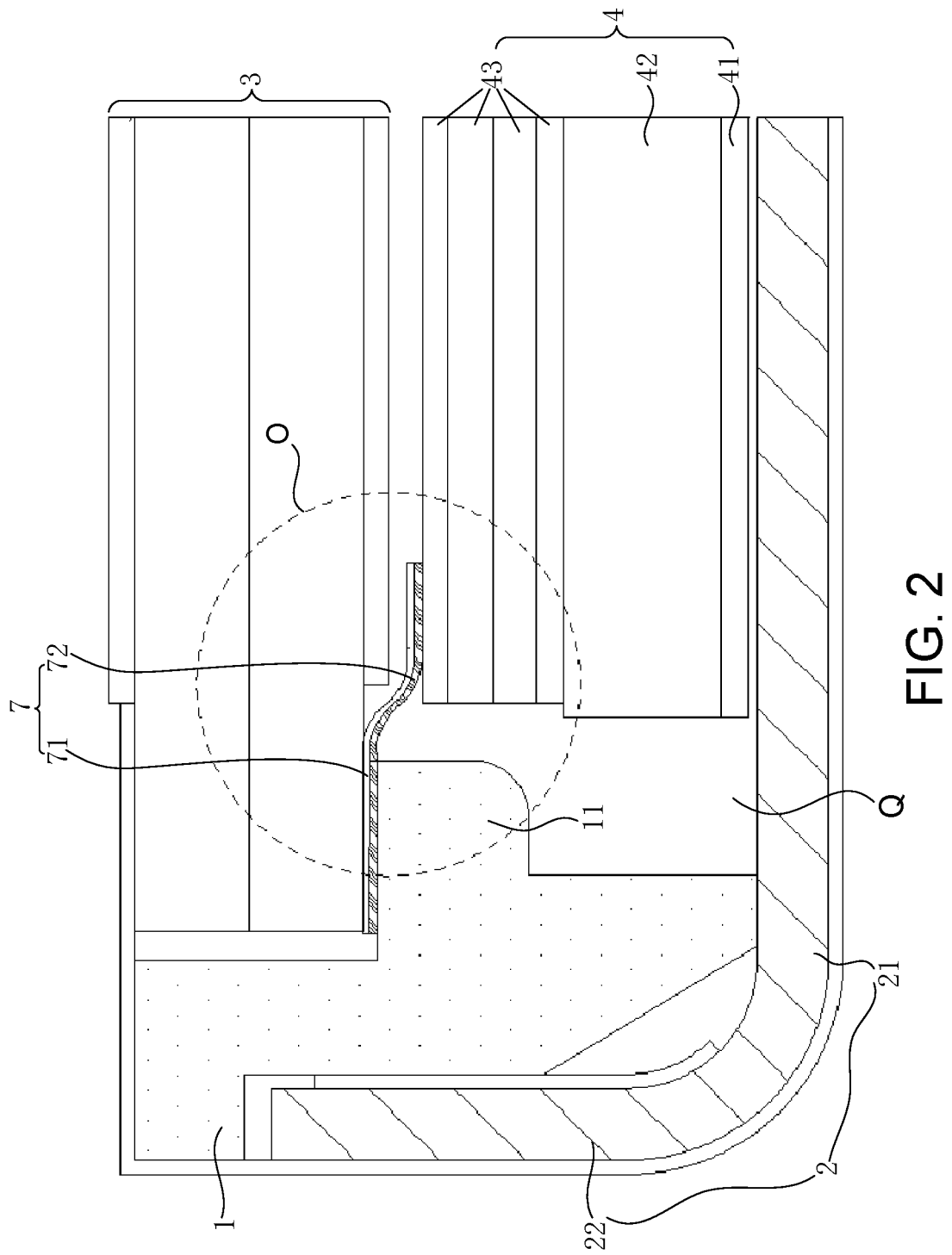
FIG. 2 is a sectional view showing a structure of another display apparatus.
Figure 3:
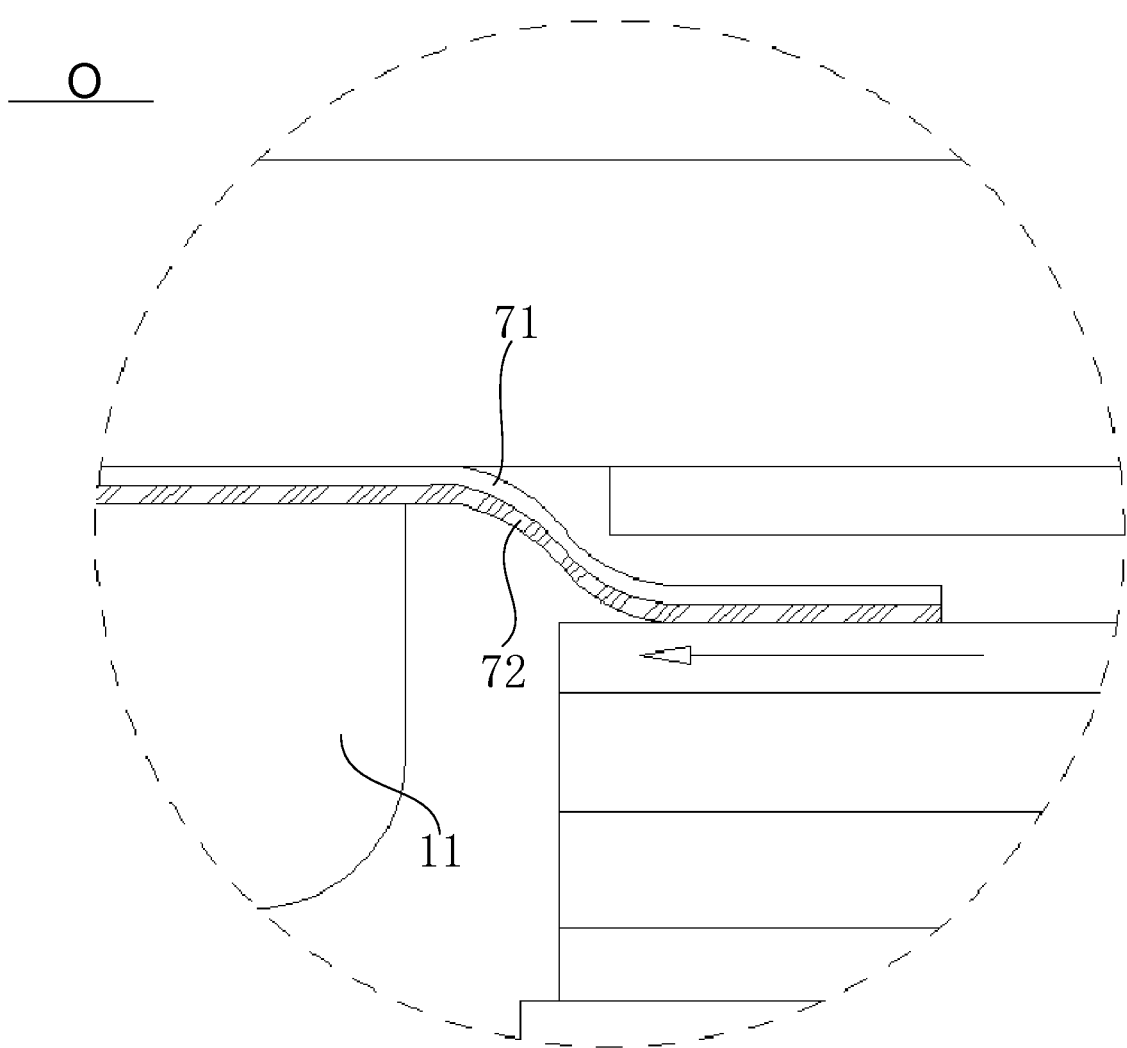
FIG. 3 is an enlarged view of the region O in FIG. 2.

As shown in FIGS. 2 and 3, in a display apparatus different from the display apparatus in the above embodiments, an adhesive tape 7 in the display apparatus includes a base layer 71 and an adhesive layer 72. The same portion of the adhesive tape 7 is adhered to the support surface of the support platform 11 and the surface of the at least one optical sheet 43 (i.e., the uppermost optical sheet 43) facing away from the bottom plate 21 to fix the optical sheet(s) 43, when a test is performed in a high temperature and high humidity environment, a position of the optical sheet(s) 43 is restricted since the same portion of the adhesive tape is adhered to the support surface of the support platform 11 and the optical sheet(s) 43. As a result, the optical sheet(s) 43 cannot expand in the direction indicated by the arrow in FIG.

Figure 4:
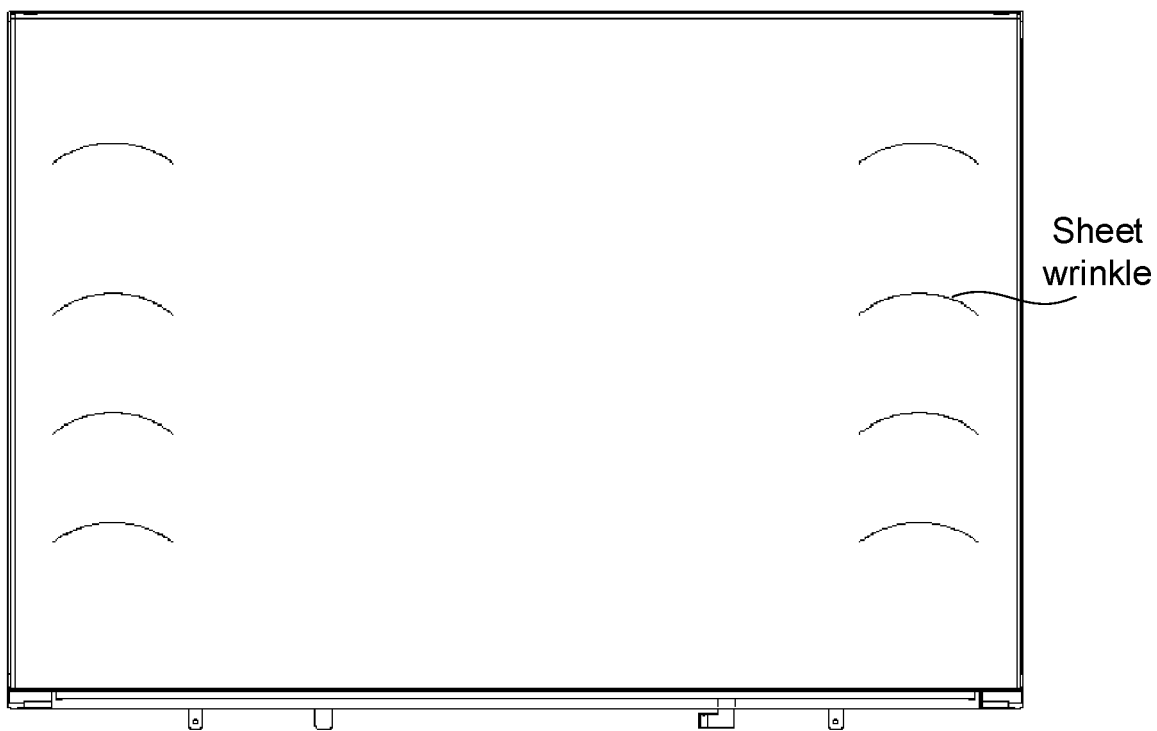
FIG. 4 is a schematic diagram of a sheet wrinkle phenomenon.

3, and an expansion amount is gathered at an adhering position of the adhesive tape on the optical sheet(s) 43, and thus the irreversible sheet wrinkle phenomenon shown in FIG. 4 occurs at the adhering position of the adhesive tape 7.

However, in the embodiments, two separate adhesive tapes (e.g., the first adhesive tape 5 and the second adhesive tape 6 in FIG. 1) are respectively adhered to the support surface of the support platform 11 and the optical sheet(s) 43, and the second base 61 is extended and lapped on the surface of the first base 51 facing away from the first adhesive portion 52, and the second base 61 and the support surface of the support platform 11 have the first overlapping region J1 therebetween. In this way, after the display apparatus is assembled, the display panel 3 may be pressed on the second base 61, and the optical sheet(s) may be fixed as well. In addition, unlike using the same adhesive tape 7 to fix the support surface of the support platform 11 and the optical sheet(s) 43, the first adhesive tape 5 and the second adhesive tape 6 are independent of each other and do not affect each other during testing by using the two separate adhesive tapes to fix the support surface of the support platform 11 and the optical sheet(s) 43, and thus the position of the optical sheet(s) 43 will not be restricted when the optical sheet(s) 43 expands in the direction indicated by the arrow, and further the sheet wrinkle phenomenon may be avoided. Moreover, in a case where the first base 51 and the second base 61 are both light-shielding bases, they also can play roles in shielding light by extending and lapping the second base 61 on the surface of the first base 51 facing away from the first adhesive portion 52.

Figure 5:
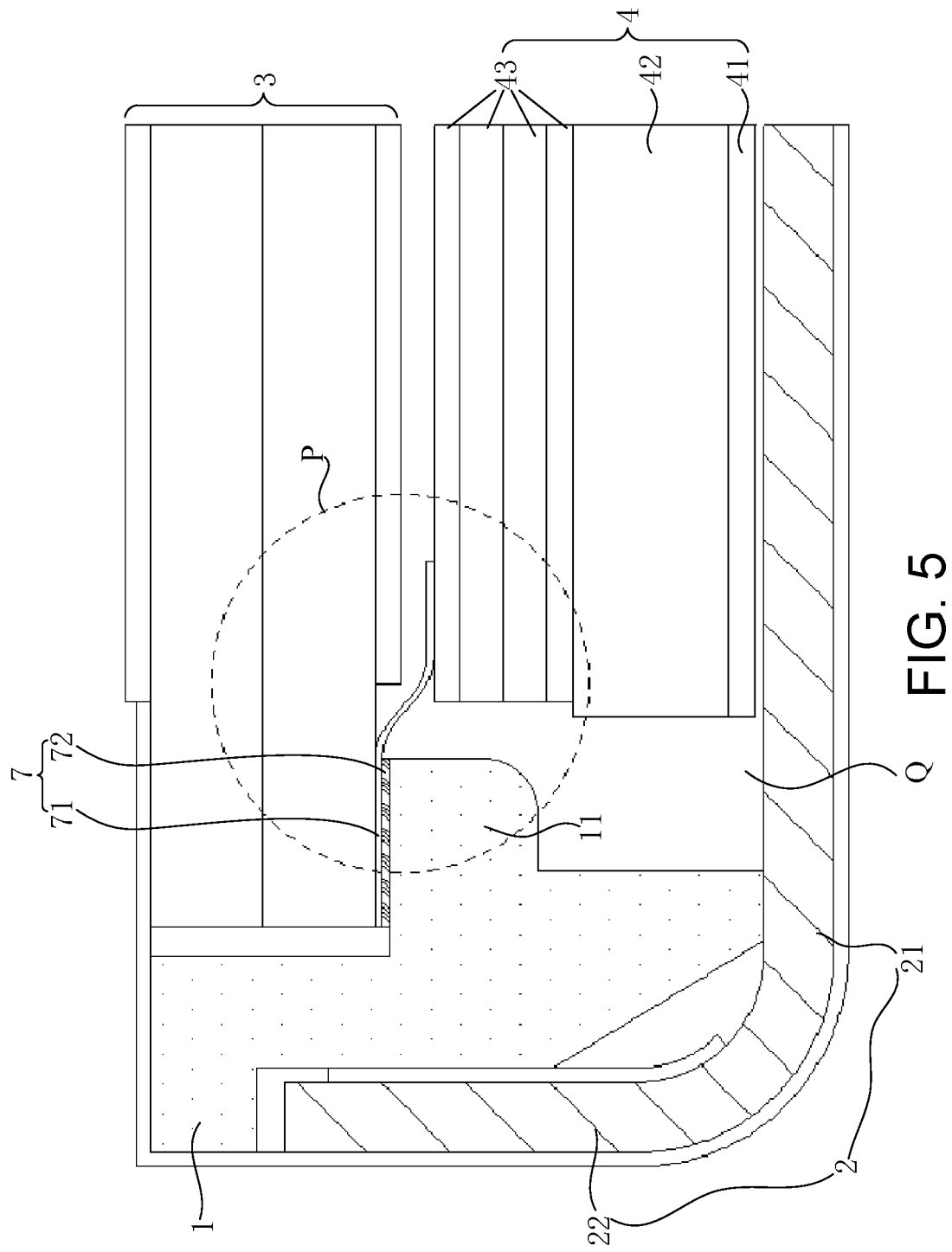
FIG. 5 is a sectional view showing a structure of yet another display apparatus.
Figure 6:
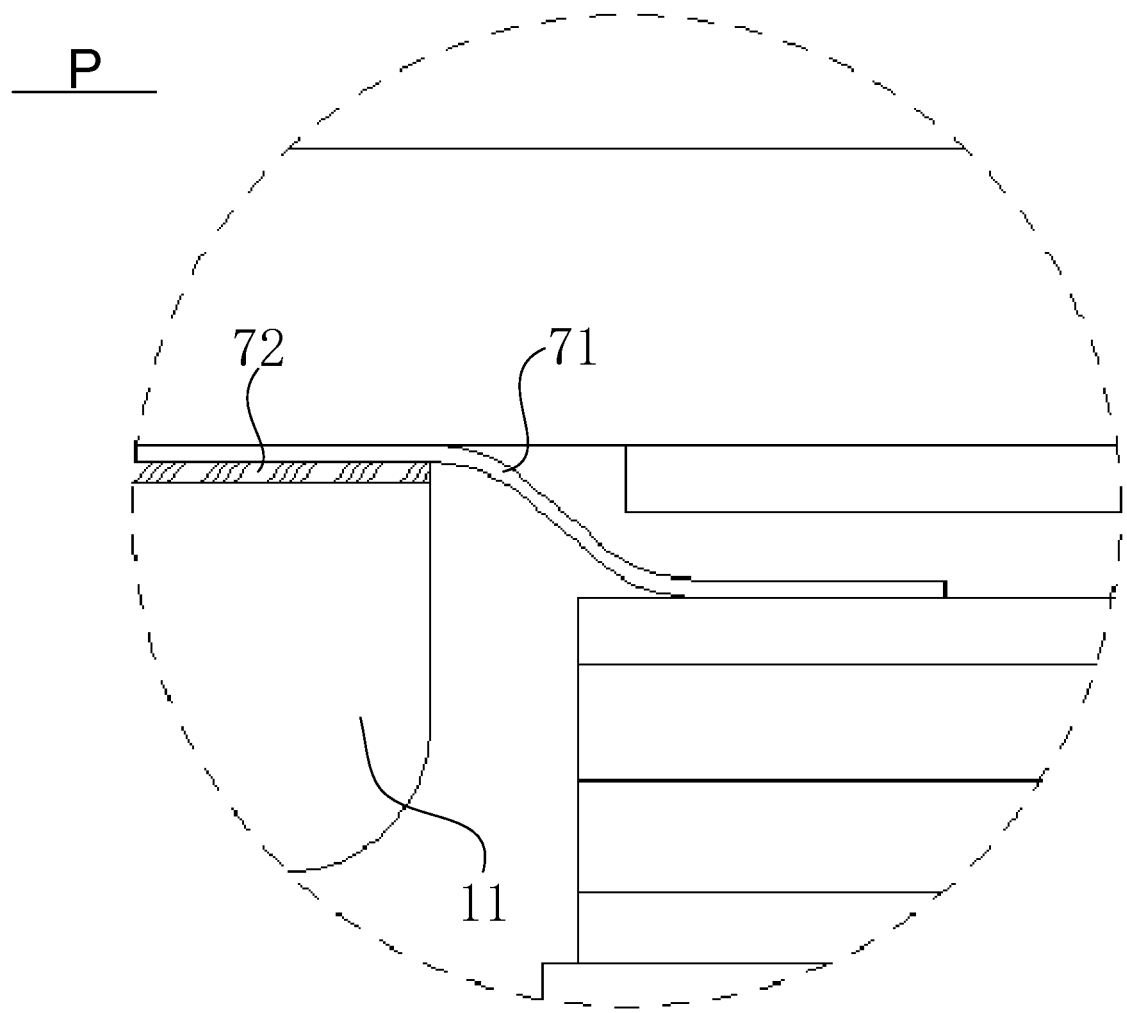
FIG. 6 is an enlarged view of the region P in FIG. 5.
Figure 7:
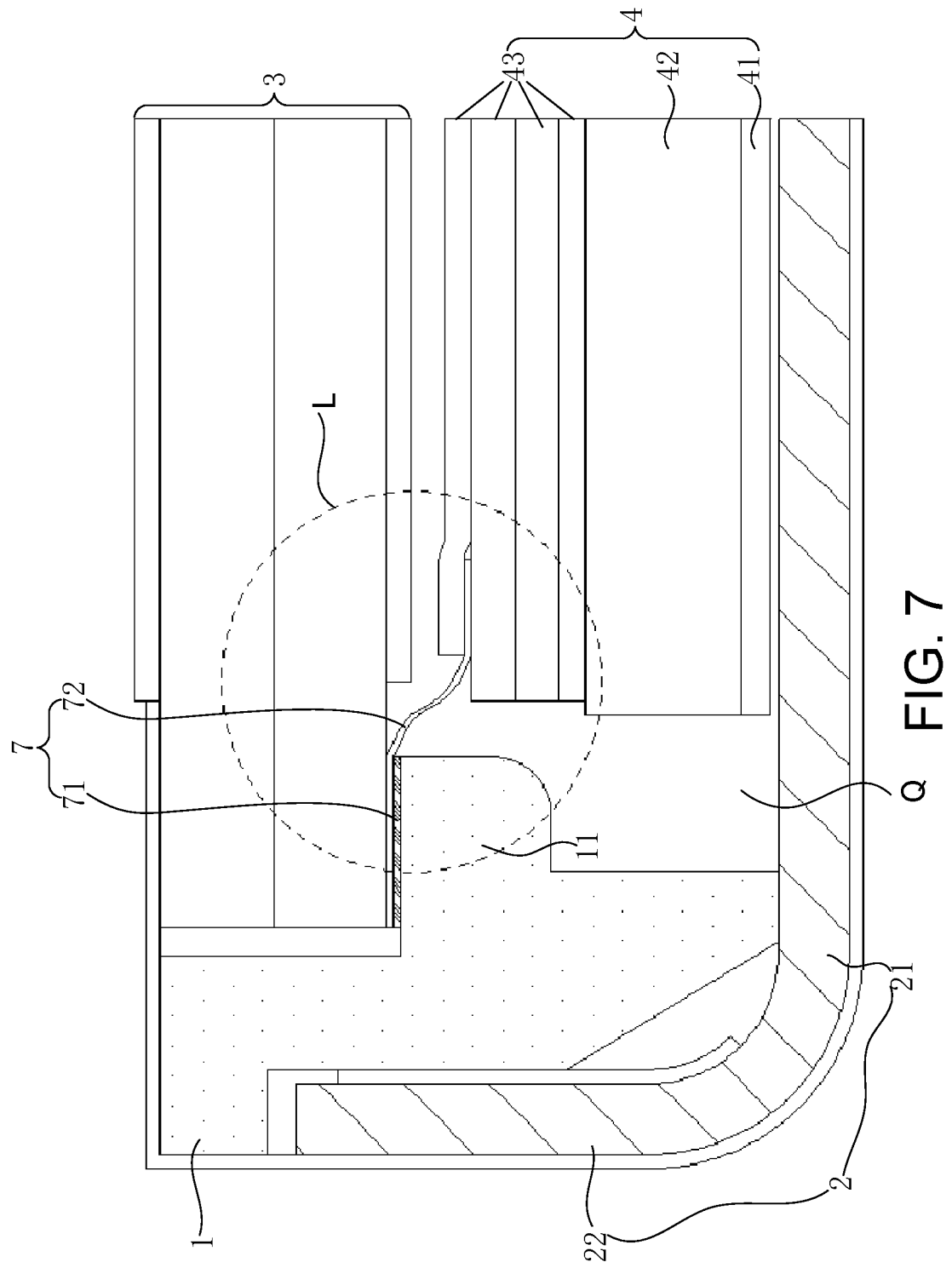
FIG. 7 is a sectional view showing a structure of yet another display apparatus.
Figure 8:
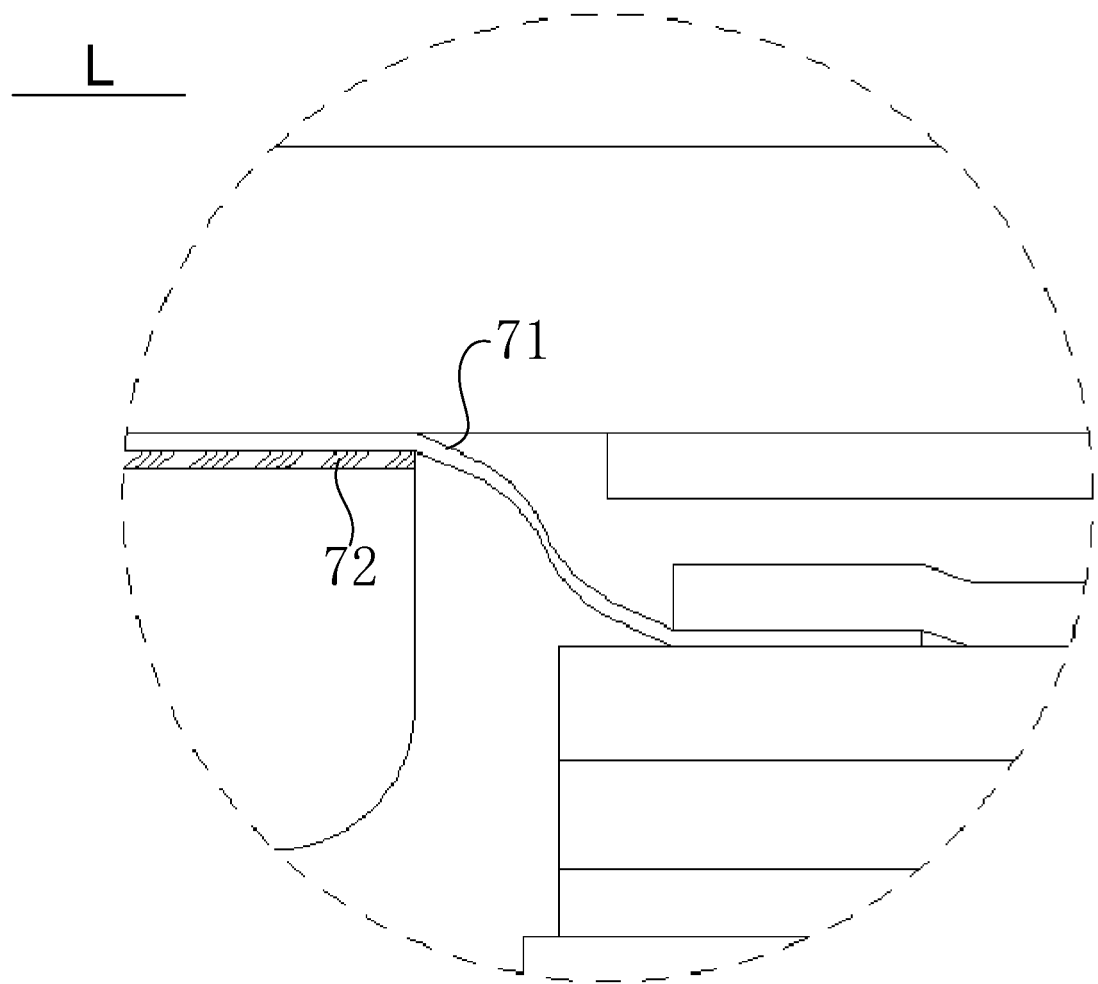
FIG. 8 is an enlarged view of the region L in FIG. 7.

In addition, as shown in FIGS. 5 and 6, in another display apparatus different from the display apparatus in the above embodiments, an adhesive tape 7 in the display apparatus includes a base layer 71 and an adhesive layer 72. The adhesion is only performed on the support surface of the support platform 11 and an adhesive-free design is used on the surface of the at least one optical sheet 43 facing away from the bottom plate 21 (as shown in the base layer 71 and the adhesive layer 72 in FIGS. 5 and 6, there is no adhesive layer 72 on the surface of the at least one optical sheet 43 facing away from the bottom plate 21), so as to avoid occurrence of the irreversible sheet wrinkle phenomenon on the optical sheet(s) 43 when the test is performed in the high temperature and high humidity environment. However, 10% of optical sheets 43 will have a separation problem during transportation of display apparatuses, that is, as shown in FIGS. 7 and 8, in all display apparatuses, uppermost sheets of the optical sheets 43 of 10% of the display apparatuses will break away from restriction of adhesive-free regions of adhesive tapes and run onto the adhesive tapes.

In the embodiments, an adhesive design is still used on the surface of the at least one optical sheet facing away from the bottom plate 21, and the display panel 3 is pressed on the second base 61 to fix the optical sheet(s) 43, the sheet wrinkling phenomenon on the optical sheet(s) 43 may be avoided when the test is performed in the high temperature and high humidity environment. Furthermore, it is also possible to avoid the problem that the optical sheets 43 will have the separation problem during transportation, thereby resulting in a local black shadow image due to local structural compression.

It will be noted that, the first adhesive tape 5 may be adhered to the support surface of the support platform 11 through a portion of the first adhesive portion 52 or the whole of first adhesive portion 52, similarly, the second adhesive tape 6 may be adhered to the surface of the at least one optical sheet 43 facing away from the bottom plate 21 through a portion of the second adhesive portion 62 or the whole of the second adhesive portion 62, which are not specifically limited herein. It will be understood by those skilled in the art that the first adhesive tape 5 and the second adhesive tape 6 are two separate structures, which do not interact with each other, and thus, in the above structures, no matter which manner of adhesion, a distance exists between the second adhesive portion 62 and each of the first base 51 and the first adhesive portion 52, that is, the second adhesive portion 62 and each of the first base 51 and the first adhesive portion 52 have no adhesion therebetween.

Figure 9:
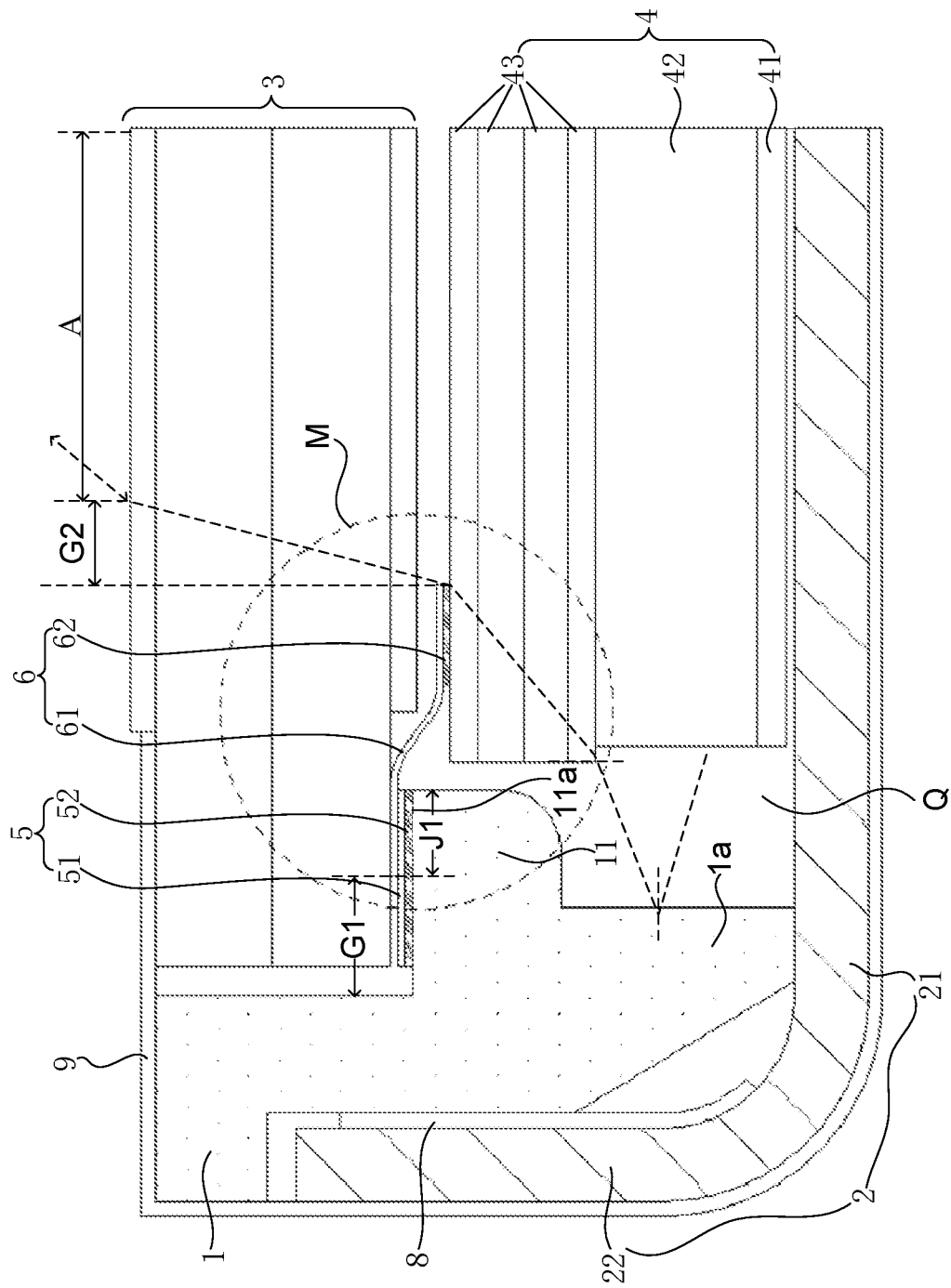
FIG. 9 is a sectional view showing a structure of a display apparatus in accordance with some other embodiments.

In some embodiments, as shown in FIGS. 1 and 9, the whole of the first adhesive portion 52 is located on the support surface 11a of the support platform 11, and the whole of the second adhesive portion 62 is located on the surface of the at least one optical sheet 43 facing away from the bottom plate 21. In this case, it may be ensured that the first adhesive portion 52 and the second adhesive portion 62 are not adhered to each other. In addition, in the embodiments, since the support surface 11a of the support platform 11 and the surface of the at least one optical sheet 43 facing away from the bottom plate 21 have a height difference therebetween, a distance must exist between the first adhesive portion 52 and the second adhesive portion 62.

In some embodiments, as shown in FIG. 1, an edge of the first adhesive portion 52 may be flush with an edge of the first base 51, that is, the first adhesive portion 52 is adhered to the whole of the first base 51. It is also possible that the edge of the first base 51 exceeds the edge of the first adhesive portion 52, that is, the first adhesive portion 52 is only adhered to a portion of the first base 51. In either case, in a case where the second base 61 is extended and lapped on the surface of the first base 51 facing away from the first adhesive portion 52, as long as the second base 61 and the support surface of the support platform 11 have the first overlapping region J1 therebetween, the display panel 3 may be ensured to be pressed on the second base 61 without being limited by an overlapping region between the first base 51 and the first adhesive portion 52.

In a case where the edge of the first adhesive portion 52 is flush with the edge of the first base 51, and the whole of the first adhesive portion 52 is located on the support surface of the support platform 11, since the second base 61 is extended and lapped on the surface of the first base 51 facing away from the first adhesive portion 52, it may be ensured that the second base 61 and the support surface of the support platform 11 have the first overlapping region J1 therebetween. And in a case where an edge of the first adhesive portion 52 facing the backlight module 4 is flush with an edge of the support platform 11, the first overlapping region J1 is a region where a portion of the second base 61 covering the first base 51 is located.

Figure 10:
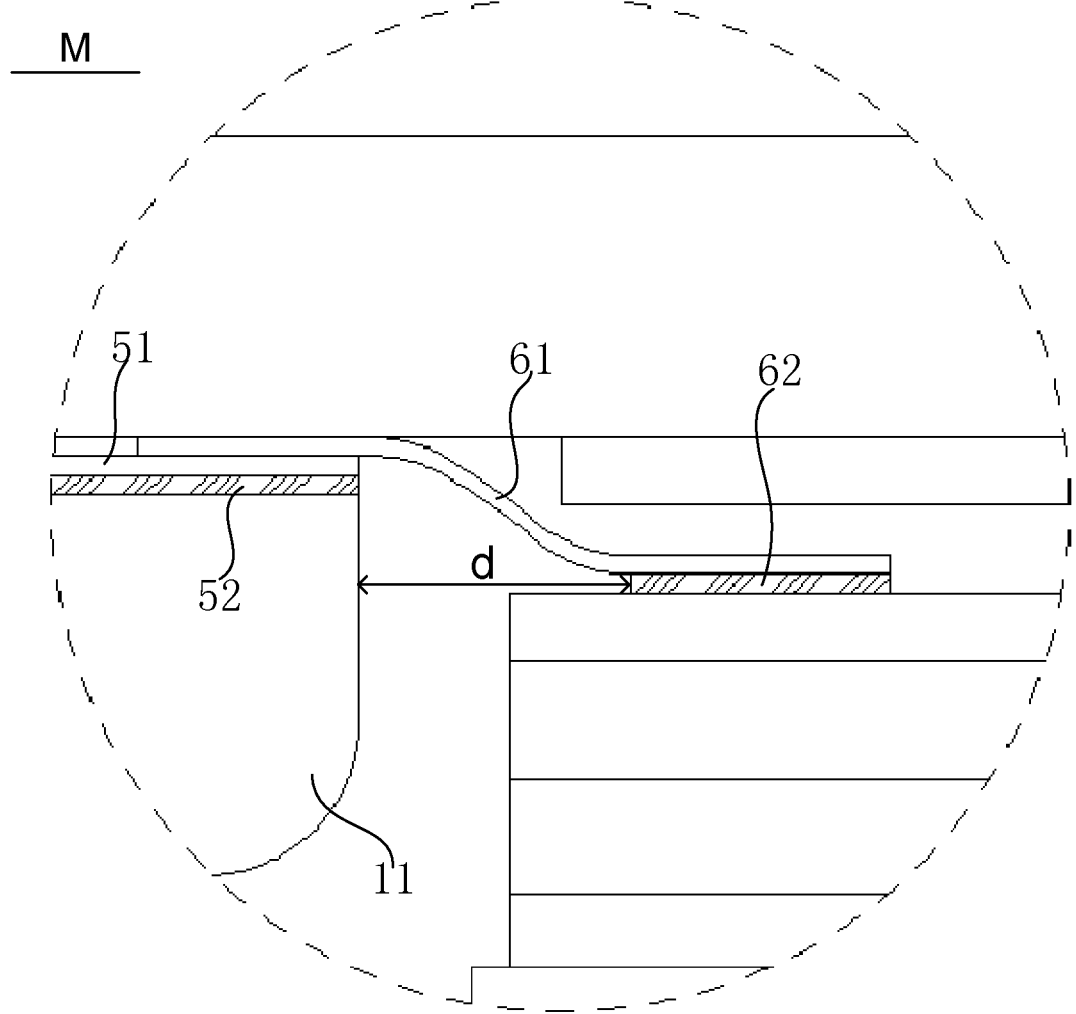
FIG. 10 is an enlarged view of the region M in FIG. 9.

In some embodiments, as shown in FIGS. 1, 9 and 10, a dimension of the first overlapping region J1 in a width direction of the first adhesive tape 5 is greater than or equal to 0.5 mm. That is, in a case where the first overlapping region J1 is a region where a portion of the second base 61 covering the first base 51 is located, a dimension of the portion of the second base 61 covering the first base 51 in the width direction of the first adhesive tape 5 is greater than or equal to 0.5 mm, which may ensure a large pressing width between the second base 61 and the display panel 3, and prevent the second base 61 from falling off the first base 51.

In some embodiments, the second base 61 covers the whole or a portion of the first base 51. That is, as shown in FIG. 1, in a case where the second base 61 covers the whole of the first base 51, an edge of the first base 51 facing the side wall of the plastic frame 1 is substantially flush with an edge of the second base 61 facing the side wall of the plastic frame 1. In this case, the pressing width of the display panel on the second base 61 may be ensured, so that the second base 61 may be prevented from falling off the surface of the first base 51. As shown in FIGS. 9 and 10, in a case where the second base 61 covers the portion of the first base 51, the edge of the second base 61 facing the side wall of the plastic frame 1 does not exceed the edge of the first base 51 facing the side wall of the plastic frame 1. In this case, the second base 61 and the side wall of the plastic frame 1 may be ensured to have a sufficient distance therebetween, so that there is a sufficient expansion space when the optical sheet (s) expand.

In some embodiments, as shown in FIGS. 1, 9 and 10, the edge of the second base 61 facing the side wall 1*a* of the plastic frame 1 and the side wall 1*a* of the plastic frame 1 have a first distance G1 therebetween. That is, there exists an expansion gap between the second base 61 and the side wall 1*a* of the plastic frame 1. In this case, there may be two cases. In the first case, as shown in FIG. 1, the edge of the first base 51 facing the side wall 1*a* of the plastic frame 1 is substantially flush with the edge of the second base 61 facing the side wall 1*a* of the plastic frame 1, and in this case, the first base 51 and the side wall 1*a* of the plastic frame 1 may also have a first distance G1 therebetween. In the second case, as shown in FIGS. 9 and 10, the second base 61 covers a portion of the first base 51, and in this case, the edge of the first base 51 facing the side wall 1*a* of the plastic frame 1 may be flush with the side wall 1*a* of the plastic frame 1, or the edge of the first base 51 facing the side wall 1*a* of the plastic frame 1 and the side wall 1*a* of the plastic frame 1 may also have a distance therebetween.

In some embodiments, the first distance G1 is greater than or equal to 0.1 mm.

In some embodiments, as shown in FIG. 9, the display panel 3 has a display area A and a peripheral area disposed around the display area A. An orthogonal projection of an edge of the second base 61 facing away from the plastic frame 1 on the display panel 3 is located outside the display area A, and the edge of the second base 61 facing away from the plastic frame 1 and the display area A have a second distance G2 therebetween, and the second distance G2 is greater than or equal to 0.5 mm and less than or equal to 0.7 mm.

According to an optical path of the light leaked from the edge position of the backlight module 4 as shown by the dashed arrow in FIG. 9, it may be known that in a case where the second base 61 is a light-shielding base, it is possible to prevent the second distance G2 from being too small to affect display of the display area, and the second base 61 may function to shield the light leaked from the edge position by limiting the second distance G2 within the above range.

In some embodiments, thicknesses of the first base 51 and the second base 61 are both within a range from 0.03 mm to 0.05 mm. In the above structure, the adhesive tape only includes one base layer 71, in order to avoid that two base layers increase the overall thickness of the display apparatus, a distance between the support surface of the support platform 11 and the bottom plate 21 may be appropriately reduced.

In some embodiments, as shown in FIGS. 1 and 9, the display apparatus may further include a double-sided tape 8 disposed between the side wall of the plastic frame 1 and the side wall 22 of the backplate 2. The double-sided tape 8 adheres the plastic frame 1 and the backplate 2 together, which may improve connection stability of the plastic frame 1 and the backplate 2.

In some embodiments, as shown in FIGS. 1 and 9, the display apparatus may further include an edge-covering adhesive tape 9. The edge-covering adhesive tape 9 is wrapped an upper surface of the plastic frame 1 facing away from the bottom plate 21, a portion of the display panel 3 proximate to the upper surface of the plastic frame 1, an outer surface of the side wall 1*a* of the plastic frame 1 proximate to the upper surface of the plastic frame 1, and an outer surface of the backplate 2, and is configured to adhere the display panel 3, the plastic frame 1 and the backplate 2 together. The edge-covering adhesive tape 9 may be a light-shielding adhesive tape, which may also prevent edge light leakage.

Figure 11:
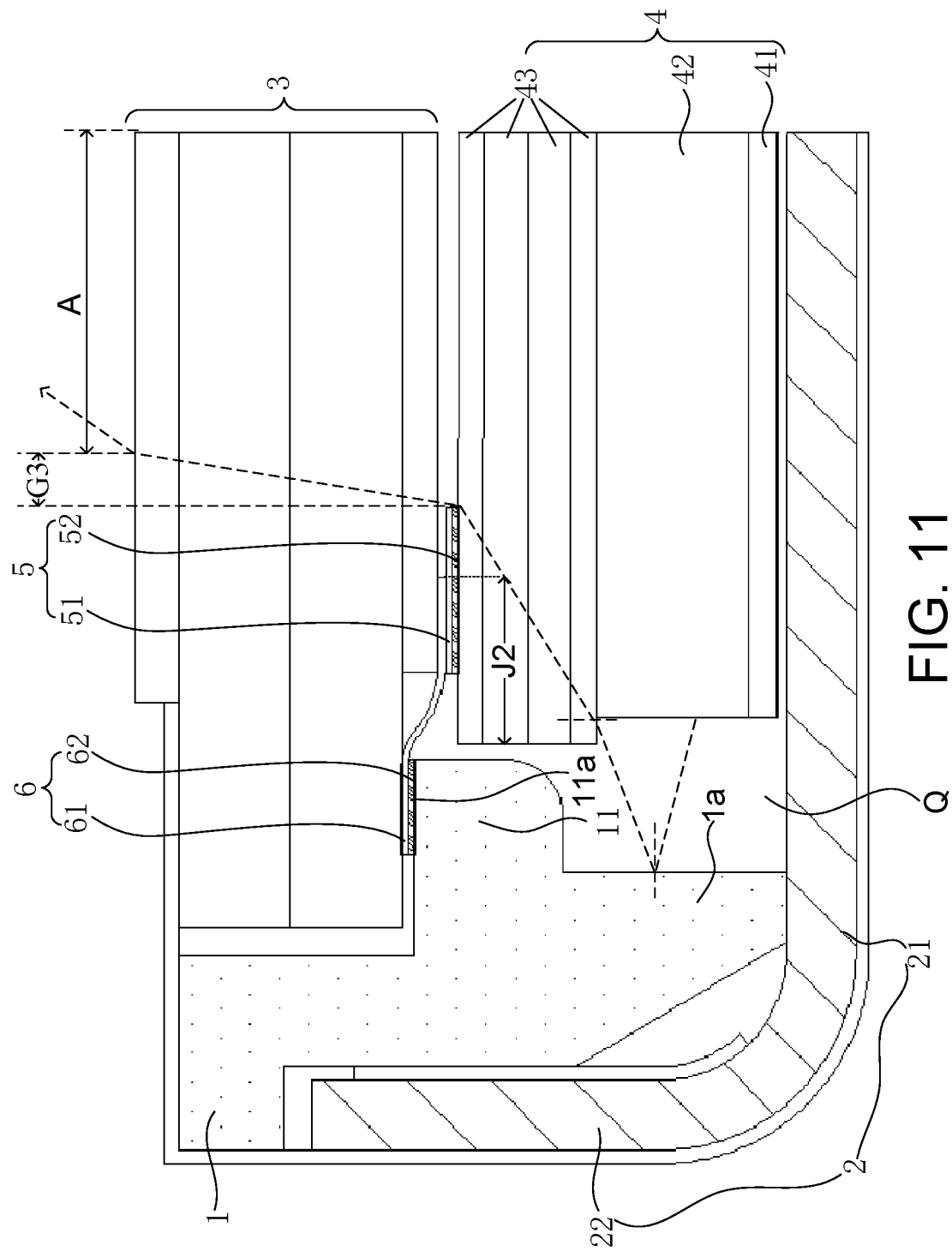
FIG. 11 is a sectional view showing a structure of a display apparatus in accordance with yet some other embodiments.

Some embodiments of the present disclosure provide a display apparatus, and as shown in FIG. 11, the display apparatus may, for example, include a plastic frame 1, a backplate 2, a display panel 3, a backlight module 4, a first adhesive tape 5 and a second adhesive tape 6. A support platform 11 is convexly provided on a side wall of the plastic frame 1. The backplate 2 includes a bottom plate 21 and a side wall 22. The backplate 2 and the plastic frame 1 are assembled together to enclose a cavity Q, and the side wall 22 of the backplate 2 is located outside the side wall of the plastic frame 1. The backlight module 4 and the display panel 3 are both located in the cavity Q. A surface of the support platform 11 facing away from the bottom plate 21 is a support surface, and the display panel 3 is disposed above the support surface of the support platform 11. The backlight module 4 is disposed on a side of the display panel 3 facing the bottom plate 21.

The backlight module 4 may include a reflective sheet 41, a light guide plate 42 and at least one optical sheet 43. The light guide plate 42 is located below the at least one optical sheet 43, and the reflective sheet 41 is located below the light guide plate 42. In an example in which the at least one optical sheet 43 includes a lower diffusion sheet, a lower prism sheet, an upper prism sheet and an upper diffusion sheet in sequence from bottom to top, the light guide plate 42 is located below the at least one optical sheet 43, which means that the light guide plate 42 is located below the lower diffusion sheet.

As shown in FIG. 11, the first adhesive portion 52 of the first adhesive tape 5 is adhered to a surface of the at least one optical sheet 43 facing away from the bottom plate 21, and the second adhesive portion 62 of the second adhesive tape 6 is adhered to the support surface of the support platform 11. The second base 61 is extended and lapped on a surface of the first base 51 facing away from the first adhesive portion 52, and the second base 61 and the surface of the at least one optical sheet 43 facing away from the bottom plate 21 have a second overlapping region J2 therebetween.

The first adhesive portion 52 of the first adhesive tape 5 is adhered to the surface of the at least one optical sheet 43 facing away from the bottom plate 21, which means that the first adhesive portion 52 of the second adhesive tape 5 is adhered to a surface of an uppermost optical sheet 43 facing away from the bottom plate 21. Still in the example in which the at least one optical sheet 43 includes the lower diffusion sheet, the lower prism sheet, the upper prism sheet and the upper diffusion sheet in sequence from bottom to top, the first adhesive portion 52 of the first adhesive tape 5 is adhered to a surface of the upper diffusion sheet facing away from the bottom plate 21.

The second base 61 is extended and lapped on the surface of the first base 51 facing away from the first adhesive portion 52, which means that the second base 61 and the first base 51 are only in contact with each other, and have no physical or chemical connection relationship therebetween. The second base 61 and the surface of the at least one optical sheet 43 facing away from the bottom plate 21 have the second overlapping region J2 therebetween, which means that a portion of the second base 61 is located on the surface of the at least one optical sheet 43 facing away from the bottom plate 21 from a front view.

Similarly, since the first adhesive tape 5 and the second adhesive tape 6 play roles in fixing the optical sheet(s) 43 and shielding light leaked from an edge position, the first base 51 and the second base 61 may both be light-shielding bases.

Based on this, when a test is performed in a high temperature and high humidity environment, since two separate adhesive tapes (the first adhesive tape 5 and the second adhesive tape 6) are respectively adhered to the optical sheet(s) 43 and the support surface of the support platform 11, unlike a situation where the same adhesive tape 7 is used to fix the support surface of the support platform 11 and the optical sheet(s) 43, the first adhesive tape 5 and the second adhesive tape 6 are independent of each other and do not affect each other. Therefore, when the optical sheet(s) 43 expand in the direction indicated by the arrow in FIG. 3, a position of the optical sheet(s) 43 is not restricted, and further a sheet wrinkle phenomenon may be avoided. By adhering the first adhesive tape 5 to the surface of the at least one optical sheet 43 facing away from the bottom plate 2, adhering the second adhesive tape 6 to the support surface of the support platform 11, and extending and lapping the second base 61 on the surface of the first base 51 facing away from the first adhesive portion 52, compared to the above structures as shown in FIGS. 5 and 6, the optical sheet(s) 43 are not adhered by using an adhesive-free design at the optical sheet(s) 43, and thus the optical sheet(s) 43 are likely to be separated during transportation (that is, the uppermost sheet in the optical sheet(s) breaks away from restriction of an adhesive-free region of the adhesive tape and runs onto the adhesive tape), although the optical sheet(s) 43 and the support platform 11 are not fixed to each other, unlike a situation shown in FIGS. 5 and 6 where only a base layer is lapped on the optical sheet(s) 43, the first adhesive tape 5 is further adhered to the optical sheet(s) 43, which may increase the overall thickness and weight of the display apparatus, and further prevent separation of the optical sheet(s) 43. According to the situation shown in FIGS. 5 and 6 where optical sheets 43 in 10% of display apparatuses may be separated, it may be seen that the structure in the embodiments of the present disclosure may further reduce possibility of separation of the optical sheet(s) 43, and may be used for mass production and transportation.

In some embodiments, as shown in FIG. 11, in a case where the display apparatus further includes a display panel 3, and the display panel 3 is disposed above the support surface of the support platform 11, the display panel 11 is in contact with a portion of the second base 61 lapped on a surface of the first base 51 facing away from the first adhesive portion 52.

In the embodiments, the display panel 3 may be pressed to the second base 61 by making the display panel 3 in contact with the portion of the second base 61 lapped on the surface of the first base 51 facing away from the first adhesive portion 52, and separation of the optical sheet(s) 43 may be further prevented.

In some embodiments, as shown in FIG. 11, the whole of the first adhesive portion 52 is located on the surface of the at least one optical sheet 43 facing away from the bottom plate 21. The whole of the second adhesive portion 62 is located on the support surface of the support platform 11. In this case, it may be ensured that the first adhesive portion 52 and the second adhesive portion 62 are not adhered to each other. In addition, in the embodiments, since the first adhesive portion 52 and the second adhesive portion 62 have a distance therebetween, the support surface of the support platform 11 and the surface of the at least one optical sheet 43 facing away from the bottom plate 21 have a certain height difference therebetween.

In some embodiments, as shown in FIG. 11, an edge of the first adhesive portion 52 may be flush with an edge of the first base 51, that is, the first adhesive portion 52 is adhered to the whole of the first base 51. It is also possible that the edge of the first base 51 exceeds the edge of the first adhesive portion 52, that is, the first adhesive portion 52 is only adhered to a portion of the first base 51. In either case, in a case where the second base 61 is extended and lapped on the surface of the first base 51 facing away from the first adhesive portion 52, and the second base 61 and the surface of the at least one optical sheet 43 facing away from the bottom plate 21 have the second overlapping region J2 therebetween, force on the optical sheet(s) 43 may be increased.

In some embodiments, as shown in FIG. 11, a dimension of the second overlapping region J2 in a width direction of the first adhesive tape 5 is greater than or equal to 0.5 mm, which may ensure the second base 61 and the surface of the at least one optical sheet 43 facing away from the bottom plate 21 have a large overlapping area, and further prevent the second base 61 from falling off the first base 51.

In some embodiments, the second base 61 covers the whole or a portion of the first base 51. In a case where the second base 61 covers the whole of the first base 51, an edge of the first base 51 facing away from the plastic frame 1 is substantially flush with an edge of the second base 61 facing away from the plastic frame 1. The display panel 3 has a display area A and a peripheral area disposed around the display area A. The first base 51 and the second base 61 are both light-shielding bases, an orthogonal projection of an edge of the first base 51 facing away from the side wall of the plastic frame 1 on the display panel 3 is located outside the display area A, the edge of the first base 51 facing away from the side wall of the plastic frame 1 and the display area A have a third distance G3 therebetween, and the third distance G3 is greater than or equal to 0.5 mm and less than or equal to 0.7 mm.

According to the optical path diagram of the light leaked from an edge position of the backlight module 4 as shown by the dashed arrow in FIG. 11, it may be known that in a case where the second base 61 is a light-shielding base, it is possible to prevent the third distance G3 from being too small to affect display of the display area A, and the second base 61 may function to shield the light leaked from the edge position by limiting the third distance G3 within the above range.

In some embodiments, thicknesses of the first base 51 and the second base 61 are both within a range from 0.03 mm to 0.05 mm. Compared to the above structures in which the adhesive tape only includes one base layer 71, in order to avoid that two base layers increase the overall thickness of the display apparatus, a distance between the support surface of the support platform 11 and the bottom plate 21 may be appropriately reduced.

Figure 12:
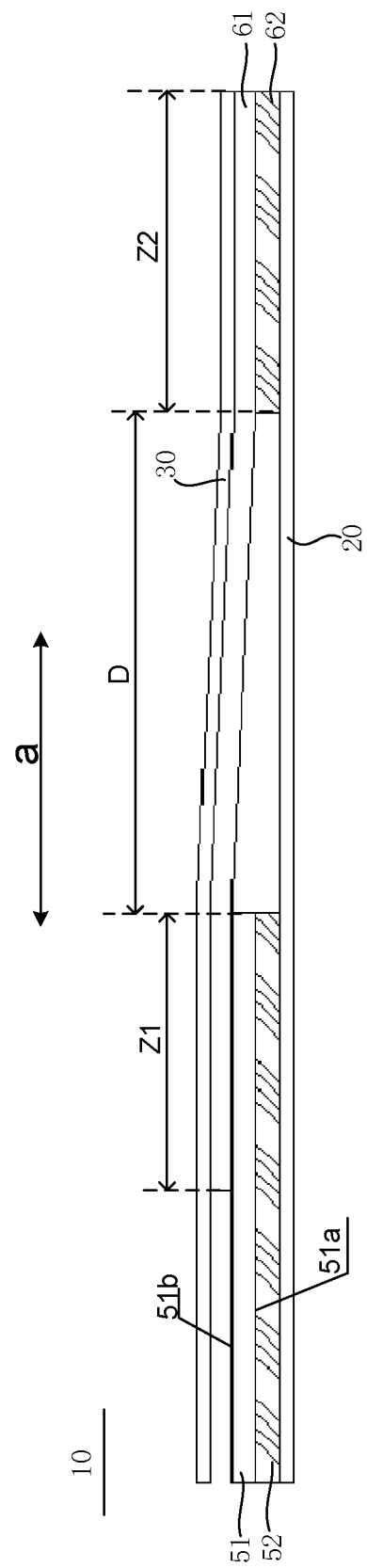
FIG. 12 is a sectional view showing a structure of an adhesive tape in accordance with some embodiments.

Some embodiments of the present disclosure provide an adhesive tape, and as shown in FIG. 12, the adhesive tape 10 includes a first base 51 and a second base 61, and a first adhesive portion 52 and a second adhesive portion 62 sequentially arranged at an interval in a width direction of the adhesive tape 10 (e.g., the direction shown by the arrow a in FIG. 12). The first base 51 includes a first surface 51a and a second surface 51b that are arranged opposite to each other in a thickness direction thereof, and the first adhesive portion 52 is adhered to the first surface 51a of the first base 51. The second base 61 has a first region Z1 and a second region Z2 that are distributed at an interval in the width direction of the adhesive tape 10. A portion of the second base 61 located in the first region Z1 is lapped on the second surface 51b of the first base 51, and the second adhesive portion 62 is adhered to a portion of the second base 61 located in the second region Z2 and is located at the same surface of the second base 61 as the first base 51.

The portion of the second base 61 located in the first region Z1 is lapped on the second surface 51b of the first base 51, which means that the portion of the second base 61 located in the first region Z1 and the second surface 51b of the first base 51 are only in contact with each other, and have no physical or chemical connection relationship therebetween.

When the above display apparatus is adhered by using the adhesive tape 10, by adhering the first adhesive portion 52 and the second adhesive portion 62 to the support surface of the support platform 11 and the surface of the at least one optical sheet 43 facing away from the bottom plate 21, respectively, lapping the portion of the second base 61 located in the first region Z1 on the second surface 51b of the first base 51, and appropriately setting a dimension of the portion of the second base 61 lapped on the surface of the first base 51 facing away from the first adhesive portion 52 in the width direction of the adhesive tape 10 according to a dimension of the first overlapping region J1 and a dimension of the second overlapping region J2 in the width direction of the first adhesive tape 5, the above adhesion of the first adhesive tape 5 and the second adhesive tape 6 may be completed. In this way, technical effects of the above display apparatus may be achieved without additionally manufacturing the first adhesive tape 5 and the second adhesive tape 6 that can satisfy the above requirements, and further the production efficiency may be improved.

Herein, it will be noted that, since the adhesive tape 10 may be applied to the assembly of the display apparatus instead of the first adhesive tape 5 and the second adhesive tape 6, the adhesive tape 10 has the same structure as the first adhesive tape 5 and the second adhesive tape 6, for example, in some embodiments, as shown in FIG. 12, an edge of the first adhesive portion 52 is substantially flush with an edge of the first base 51.

In some embodiments, as shown in FIG. 12, the second base 61 covers the whole or a portion of the second surface of the first base 51.

In some embodiments, as shown in FIG. 12, in a case where the second base 61 covers the whole of the second surface 51b of the first base 51, an edge of the first base 51 facing away from the second adhesive portion 62 in the width direction of the adhesive tape 10 is substantially flush with an edge of the second base 61.

That is, when the adhesive tape 10 is applied to the display apparatus as shown in FIGS. 1 and 9, an edge of the second base 61 facing the side wall of the plastic frame 1 does not exceed an edge of the first base 51 facing the side wall of the plastic frame 1, which may ensure that there is an expansion gap between the second base 61 and the side wall of the plastic frame 1. When the adhesive tape 10 is applied to the display apparatus as shown in FIG. 11, an edge of the second base 61 facing away from the side wall of the plastic frame 1 does not exceed an edge of the first base 51 facing away from the side wall of the plastic frame 1, and a problem that the second base 61 exceeds the edge of the first base 51 facing away from the side wall of the plastic frame 1, which is not favorable for control of the third distance G3 may be prevented.

In some embodiments, as shown in FIG. 12, a distance D between the first adhesive portion 52 and the second adhesive portion 62 is within a range from 0.5 mm to 1.0 mm in the width direction of the adhesive tape 10. That is, according to the situations that there is a certain distance between an adhering position of the first adhesive portion 52 and an adhering position of the second adhesive portion 62, the distance d (as shown in FIG. 10) between the adhering position of the first adhesive portion 52 and the adhering position of the second adhesive portion 62 is slightly less than 0.5 mm to 1.0 mm, and there is a certain height difference between the support surface of the support platform 11 and the surface of the at least one optical sheet 43 facing away from the bottom plate 21, it may be seen that by limiting the distance between the first adhesive portion 52 and the second adhesive portion 62 within the above range, the first adhesive portion 52 and the second adhesive portion 62 may be directly adhered to corresponding positions when in use, that is, the first adhesive tape 5 and the second adhesive tape 6 may be adhered to corresponding positions as shown in FIG. 1, 9 or 11. Adhering positions of the first adhesive portion 52 and the second adhesive portion 62 do not need to be adjusted, and thus the adhering efficiency is improved.

In some embodiments, as shown in FIG. 12, a dimension of a portion of the second base 61 lapped on the second surface 51b of the first base 51 in the width direction of the adhesive tape 10 is greater than or equal to 0.5 mm. As shown in FIGS. 1 and 9, the display panel 3 and the second base 61 may be ensured to have a large crimping width therebetween, so as to prevent the second base 61 from falling off the first base 51. As shown in FIG. 11, the second base 61 and the first adhesive tape 5 may be ensured to have a large overlapping area therebetween to increase weight applied to the optical sheet(s) 43 by the first adhesive tape 5.

In some embodiments, as shown in FIG. 12, the adhesive tap 10 further includes a support layer 20. The support layer 20 is disposed on a side of the first adhesive portion 52 and the second adhesive portion 62 facing away from the first base 51 and the second base 61. The first adhesive portion 52 and the second adhesive portion 62 are peelably adhered to the support layer 20.

In the embodiments, the support layer 20 is able to support the first adhesive portion 52, the second adhesive portion 62, the first base 51 and the second base 61, and the support layer 20 is peeled off when in use and then adhesion of the first adhesive portion 52 and the second adhesive portion 62 are achieved.

In some embodiments, as shown in FIG. 12, the adhesive tap 10 further includes a protective layer 30. The protective layer 30 is peelably attached to a surface of the second base 61 facing away from the second adhesive portion 62. In the case where the second base 61 covers the portion of the second surface 51b of the first base 51, the protective layer 30 is extended to a region of the first base 51 not covered by the second base 61.

In the embodiments, the protective layer 30 is able to protect surfaces of the second base 61 and the first base 51 from scratches, and is able to ensure the cleanliness of the materials themselves. After adhesion is completed, the protective layer 30 may be peeled off.

Figure 13A:
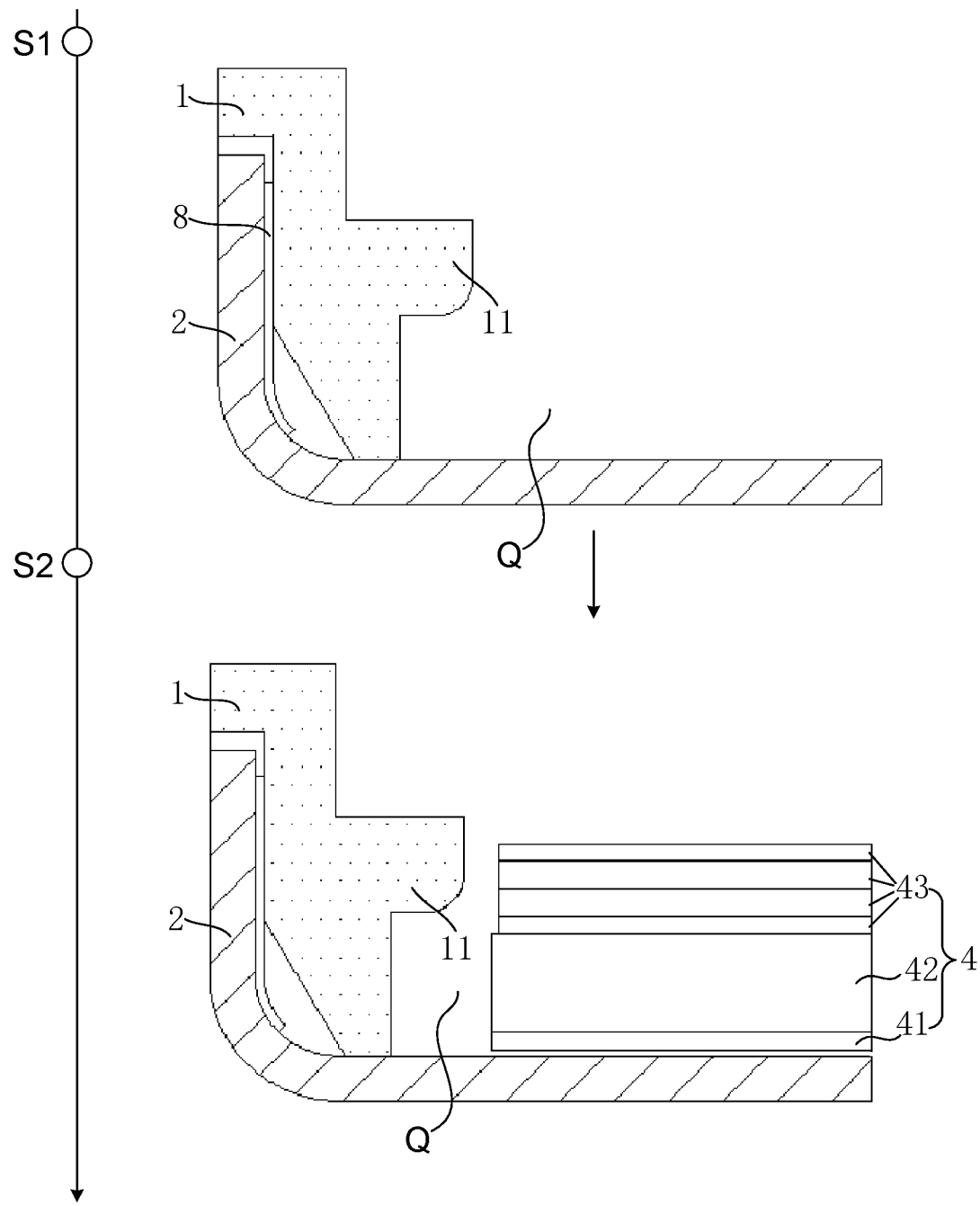
FIGS. 13A to 13C are flow diagrams of a method for assembling a display apparatus in accordance with some embodiments.
Figure 13B:
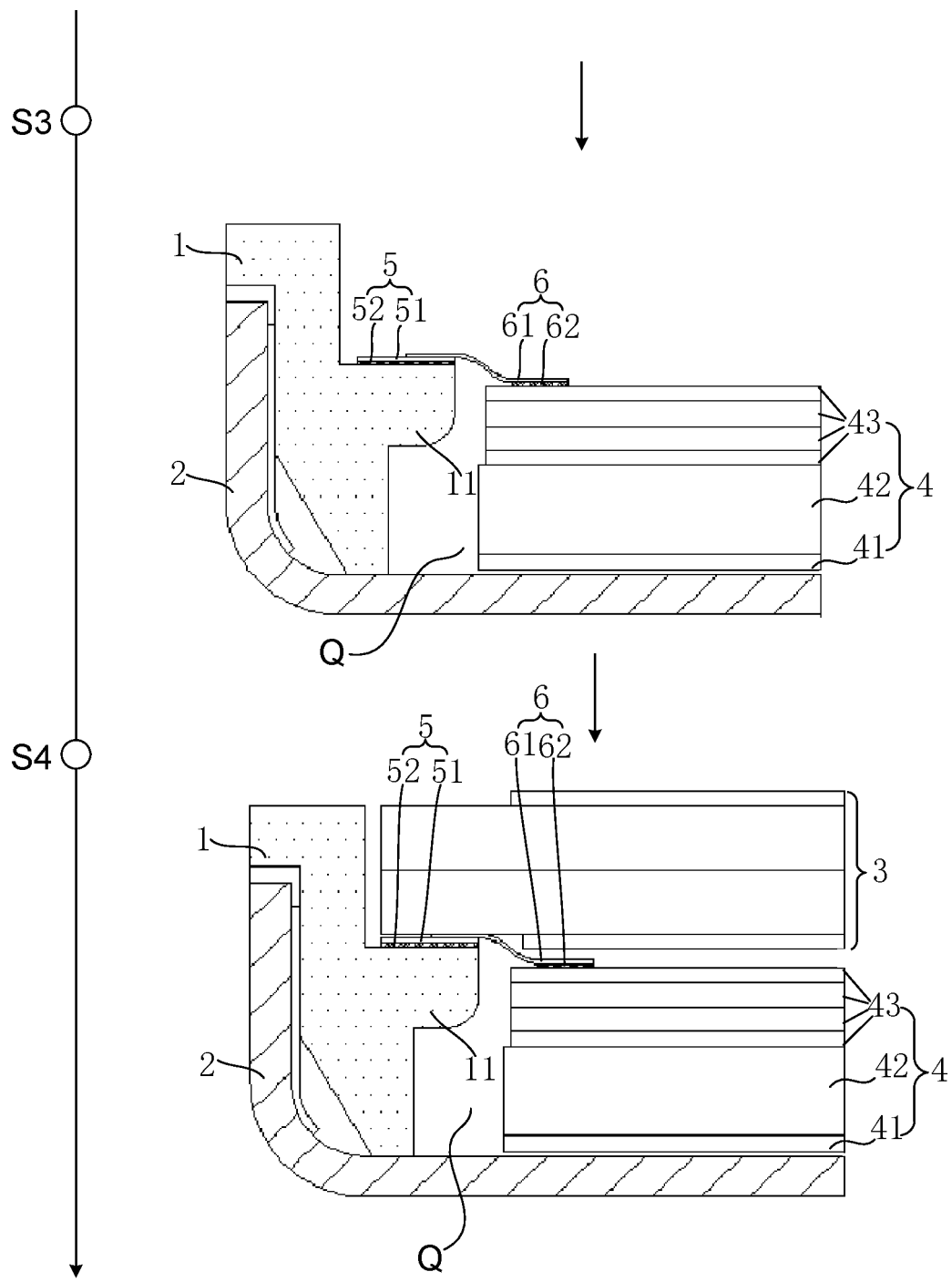
Figure 13C:
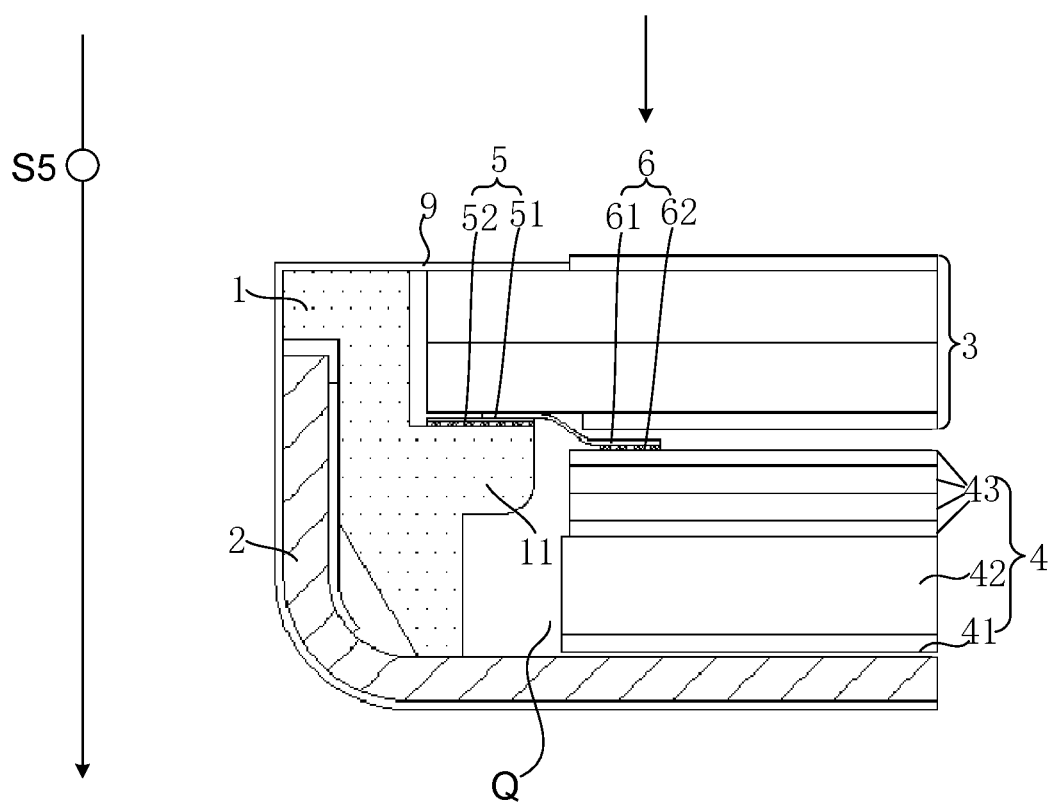

Some embodiments of the present disclosure provide a method for assembling a display apparatus. As shown in FIGS. 13A to 13C, the method includes the following steps.

In S1, a cavity Q enclosed by a plastic frame 1 and a backplate 2 is provided, and a first adhesive tape 5 and a second adhesive tape 6 are provided. A support platform 11 is convexly disposed on a side wall of the plastic frame 1. The backplate 2 includes a bottom plate 21 and a side wall 22, and the side wall 22 of the backplate 2 is located outside the side wall of the plastic frame 1, and a surface of the support platform 11 facing away from the bottom plate 21 is a support surface. The first adhesive tape 5 includes a first base 51 and a first adhesive portion 52 located on a surface of the first base 51, and the second adhesive tape 6 includes a second base 61 and a second adhesive portion 62 located on a surface of the second base 61.

The cavity Q may be formed by assembling and enclosing the plastic frame 1 and the backplate 2 together. During assembling, a double-sided tape 8 may be adhered to an inner side of the side wall 22 of the backplate 2, after the plastic frame 1 and the backplate 2 are assembled together, the side wall of the plastic frame 1 and the side wall 22 of the backplate 2 are adhered together by the double-sided tape 8, so that connection stability of the plastic frame 1 and the backplate 2 may be improved.

In S2, at least one optical sheet 43 is placed in the cavity Q enclosed by the plastic frame 1 and the backplate 2.

The backlight module 4 may further include a reflective sheet 41, and a light guide plate 42 in addition to the at least one optical sheet 43, and thus before the at least one optical sheet 43 is placed in the cavity Q enclosed by the plastic frame 1 and the backplate 2, the method further includes sequentially placing the reflective sheet 41 and the light guide plate 42 in the cavity Q. Of course, the backlight module 4 may further include a light bar, and the light bar may be disposed at a side of the light guide plate 42.

The optical sheet(s) 43 may include a lower diffusion sheet, a lower prism sheet, an upper prism sheet and an upper diffusion sheet, which are sequentially disposed from bottom to top. In this way, a surface of the at least one optical sheet 43 facing away from the bottom plate 21 is a surface of the upper diffusion sheet.

In S3, the first adhesive tape 5 is adhered to the support surface of the support platform 11 through the first adhesive portion 52, and the second adhesive tape 6 is adhered to the surface of the at least one optical sheet 43 facing away from the bottom plate 21 through the second adhesive portion 62, and the second base 61 is extended and lapped on a surface of the first base 51 facing away from the first adhesive portion 52, and the second base 61 and the support surface of the support platform 11 have a first overlapping region J1 therebetween.

An operation that the first adhesive tape 5 is adhered to the support surface of the support platform 11 and the second adhesive tape 6 is adhered to the surface of the at least one optical sheet 43 facing away from the bottom plate 21 may be performed manually, or may be performed by a machine, e.g., by controlling a mechanical arm to simulate the action of humans.

The first adhesive tape 5 and the second adhesive tape 6 may be temporarily manufactured adhesive tapes, for example, the first adhesive tape 5 and the second adhesive tape 6 may be obtained by coating the first adhesive portion 52 on the first base 51 with a certain shape, and coating the second adhesive portion 62 on the second base 61 with a certain shape. The first adhesive tape 5 and the second adhesive tape 6 may also constitute the adhesive tape 10 as shown in FIG. 12. The first adhesive portion 52 and the first base 51 in the adhesive tape 10 constitute the first adhesive tape 5, and the second adhesive portion 62 and the second base 61 in the adhesive tape 10 constitute the second adhesive tape 6. It is also possible that the first adhesive tape 5 is a temporarily manufactured adhesive tape, and the second adhesive tape 6 is an adhesive tape composed of the second adhesive portion 62 and the second base 61 in the adhesive tape 10.

In a case where the first adhesive tape 5 is an adhesive tape composed of the first adhesive portion 52 and the first base 51 in the adhesive tape 10, and/or the second adhesive tape 6 is an adhesive tape composed of the second adhesive portion 62 and the second base 61 in the adhesive tape 10, and the adhesive tap 10 further includes the support layer 20, the first adhesive portion 52 and/or the second adhesive portion 62 may be peeled off from the support layer 20 during adhering, and the first adhesive portion 52 with the first base 51 and the second adhesive portion 62 with the second base 61 are respectively adhered to the support surface of the support platform 11 and the surface of the at least one optical sheet 43 facing away from the bottom plate 21. Correspondingly, in a case where the adhesive tape 10 further includes the protective layer 30, the protective layer 30 may be peeled off after the first adhesive portion 52 with the first base 51 and the second adhesive portion 62 with the second base 61 are respectively adhered to the support surface of the support platform 11 and the surface of the at least one optical sheet 43 facing away from the bottom plate 21.

In S4, the display panel 3 is placed above the support surface of the support platform 11.

In S5, an edge-covering adhesive tape 9 is adhered.

Beneficial technical effects of the method for assembling the display apparatus provided by the embodiments of the present disclosure are the same as the beneficial technical effects of the display apparatus provided by the embodiments of the present disclosure, and details will not be repeated herein.

Figure 14A:
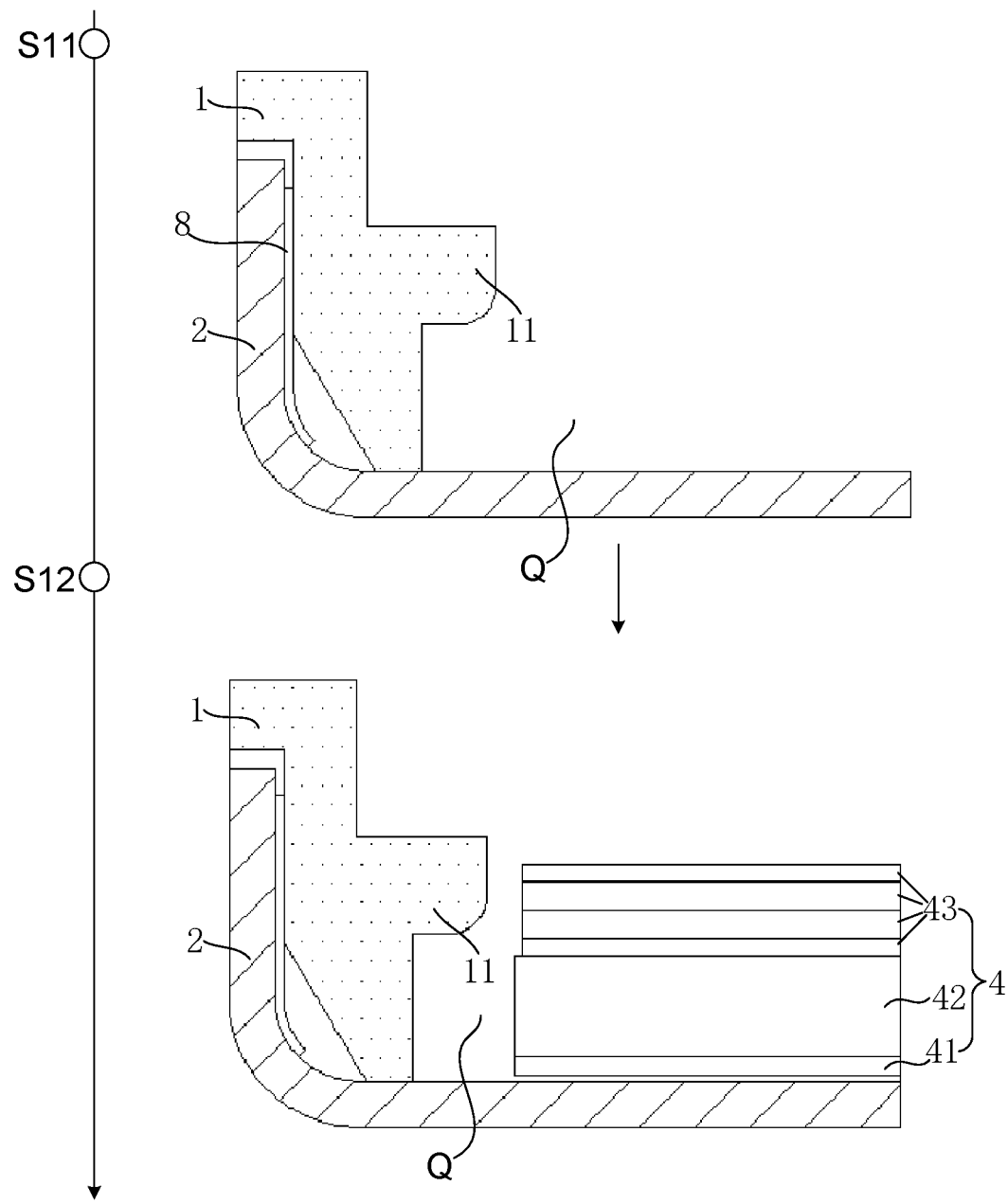
FIGS. 14A to 14C are flow diagrams of a method for assembling a display apparatus in accordance with some other embodiments.
Figure 14B:
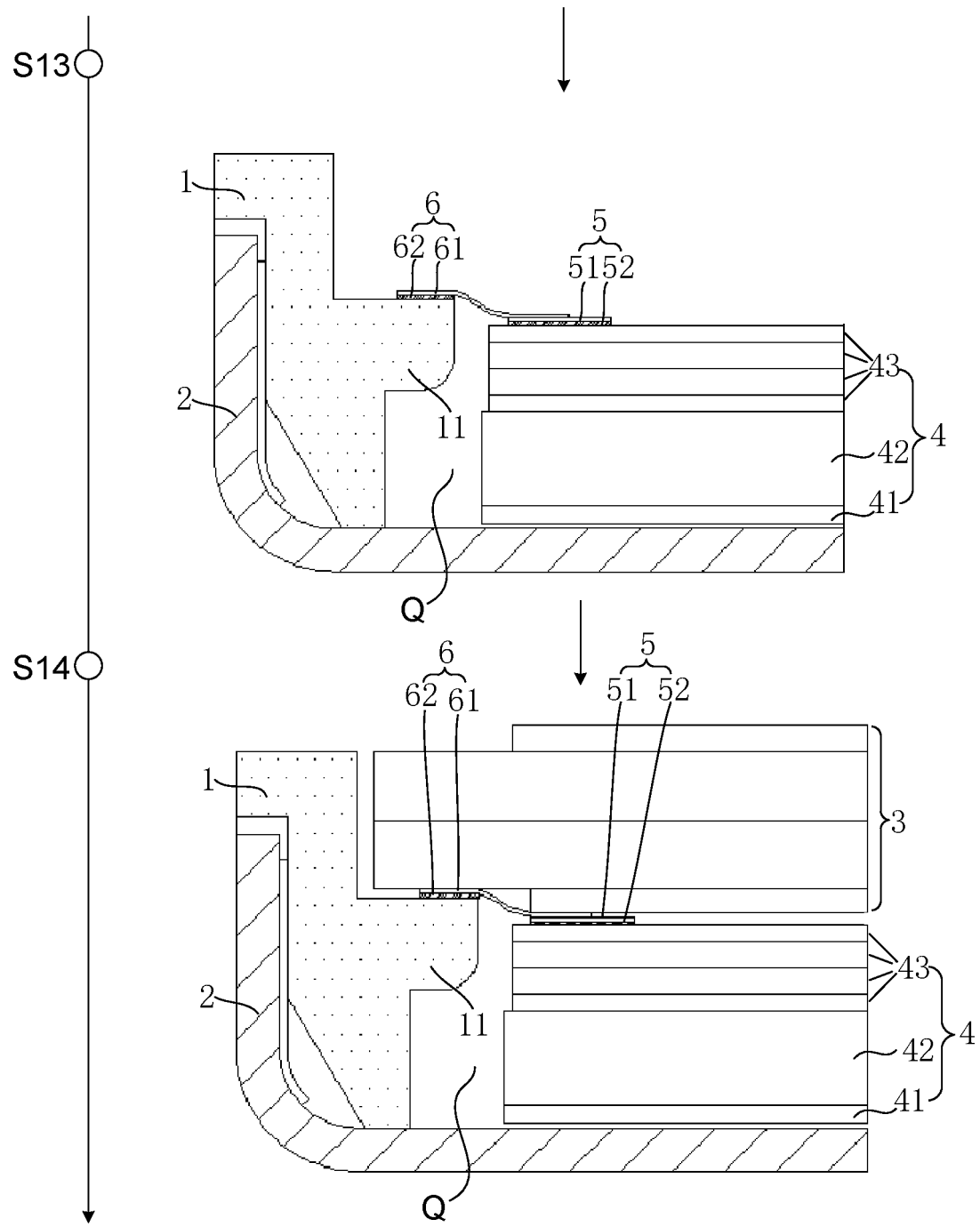
Figure 14C:
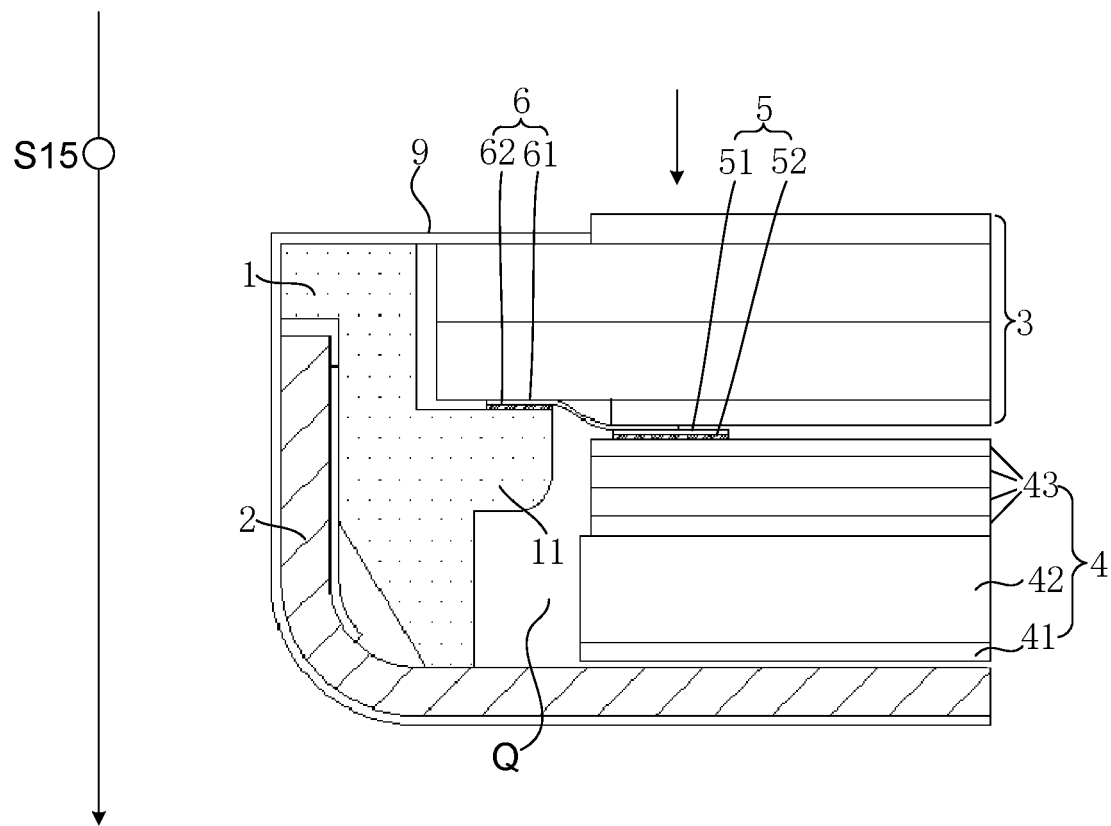

Some embodiments of the present disclosure provide a method for assembling a display apparatus. As shown in FIGS. 14A to 14C, the method includes the following steps.

In S11, a cavity Q enclosed by a plastic frame 1 and a backplate 2 is provided, and a first adhesive tape 5 and a second adhesive tape 6 are provided. The plastic frame, the backplate 2, the first adhesive tape 5 and the second adhesive tape 6 in S11 have the same technical features as the plastic frame, the backplate 2, the first adhesive tape 5 and the second adhesive tape 6 in S1, and details will not be repeated herein.

In S12, at least one optical sheet 43 is placed in the cavity Q enclosed by the plastic frame 1 and the backplate 2.

Details are the same as details of S2, which will not be repeated herein.

In S13, the first adhesive tape 5 is adhered to a surface of the at least one optical sheet 43 facing away from the bottom plate 11 through the first adhesive portion 52, and the second adhesive tape 6 is adhered to the support surface of the support platform 11 through the second adhesive portion 62, and the second base 61 is extended and lapped on a surface of the first base 51 facing away from the first adhesive portion 52, and the second base 61 and the support surface of the support platform 11 have a second overlapping region J2 therebetween.

An operation of this step is similar to the operation of S3, which may also be performed manually or by a machine.

In this step, the first adhesive tape 5 and the second adhesive tape 6 may be temporarily manufactured adhesive tapes, or may be an adhesive tape composed of the first adhesive portion 52 and the first base 51 and an adhesive tape composed of the second adhesive portion 62 and the second base 61 in the adhesive tape 10 as shown in FIG. 12. the first adhesive portion 52 and the second adhesive portion 62 are adhered to positions different from that in S3, and in directions opposite to that in S3 in these embodiments.

In S14, the display panel 3 is placed above the support surface of the support platform 11.

In S15, an edge-covering adhesive tape 9 is adhered.

Beneficial technical effects of the method for assembling the display apparatus provided by the embodiments of the present disclosure are the same as the beneficial technical effects of the display apparatus provided by the embodiments of the present disclosure, and details will not be repeated herein.

The foregoing descriptions are merely specific implementations of the present disclosure, but the protection scope of the present disclosure is not limited thereto, and changes or replacements that any person skilled in the art could conceive of within the technical scope of the present disclosure shall be within the protection scope of the present disclosure. Therefore, the protection scope of the present disclosure shall be subject to the protection scope of the claims.

What is claimed is:

1. An adhesive tape, comprising:
   a first adhesive portion and a second adhesive portion that are arranged at an interval in a width direction of the adhesive tape;
   a first base, the first base including a first surface and a second surface that are arranged opposite to each other in a thickness direction thereof; and
   a second base, the second base having a first region and a second region that are distributed at an interval in the width direction of the adhesive tape, and a portion of the second base located in the first region being lapped on the second surface of the first base; wherein
   the first adhesive portion is adhered to the first surface of the first base; and
   the second adhesive portion is adhered to a portion of the second base located in the second region, and being located at a same surface of the second base as the first base.

2. The adhesive tape according to claim 1, wherein an edge of the first adhesive portion is flush with an edge of the first base located at a same side.

3. The adhesive tape according to claim 1, wherein the second base covers a whole of the second surface of the first base, and an edge of the first base facing away from the second adhesive portion in the width direction of the adhesive tape is flush with an edge of the second base located at a same side.

4. The adhesive tape according to claim 1, wherein a distance between the first adhesive portion and the second adhesive portion is within a range from 0.5 mm to 1.0 mm in the width direction of the adhesive tape.

5. The adhesive tape according to claim 1, further comprising: a support layer, wherein
   the support layer is disposed on a surface of the first adhesive portion facing away from the first base and a surface of the second adhesive portion facing away from the second base, and the first adhesive portion and the second adhesive portion are peelably adhered to the support layer.

6. The adhesive tape according to claim 1, further comprising: a protective layer, wherein
   the protective layer is peelably attached to a surface of the second base facing away from the second adhesive portion; and
   the second base covers a portion of the second surface of the first base, and the protective layer is extended to a region of the first base exposed by the second base.

7. A display apparatus, comprising:
   a backplate, the backplate including a bottom plate and a side wall;
   a plastic frame, the plastic frame and the bottom plate of the backplate enclosing a cavity, the plastic frame including a support platform convexly disposed on a side wall of the plastic frame, and a surface of the support platform facing away from the bottom plate being a support surface;
   at least one optical sheet, the at least one optical sheet being disposed in the cavity; and
   an adhesive tape, the adhesive tape including a first adhesive portion and a second adhesive portion that are arranged at an interval in a width direction of the adhesive tape, a first base and a second base; the first base including a first surface and a second surface that are arranged opposite to each other in a thickness direction thereof; the second base having a first region and a second region that are distributed at an interval in the width direction of the adhesive tape, and a portion of the second base located in the first region being lapped on the second surface of the first base; the first adhesive portion being adhered to the first surface of the first base; and the second adhesive portion being adhered to a portion of the second base located in the second region, and being located at a same surface of the second base as the first base; wherein the first adhesive portion is adhered to the support surface of the support platform, the second adhesive portion is adhered to a surface of the at least one optical sheet facing away from the bottom plate, and the second base and the support surface of the support platform have a first overlapping region therebetween.

8. The display apparatus according to claim 7, wherein an edge of the first adhesive portion is flush with an edge of the first base located at a same side.

9. The display apparatus according to claim 7, wherein the second base covers a whole of the first base, an edge of the first base facing the side wall of the plastic frame is flush with an edge of the second base facing the side wall of the plastic frame.

10. The display apparatus according to claim 7, wherein the first adhesive portion is entirely located on the support surface of the support platform.

11. The display apparatus according to claim 7, wherein the second adhesive portion is entirely located on the surface of the at least one optical sheet facing away from the bottom plate.

12. The display apparatus according claim 7, wherein the first base and the second base are both light-shielding bases.

13. The display apparatus according to claim 7, wherein thicknesses of the first base and the second base are both within a range from 0.03 mm to 0.05 mm.

14. The display apparatus according to claim 7, wherein an edge of the second base facing the side wall of the plastic frame and the side wall of the plastic frame have a first distance therebetween.

15. The display apparatus according to claim 7, further comprising: a display panel disposed above the support surface of the support platform, the display panel having a display area; wherein the second base is a light-shielding base; and an orthogonal projection of an edge of the second base facing away from the side wall of the plastic frame on the display panel is located outside the display area, the orthogonal projection of the edge of the second base facing away from the side wall of the plastic frame on the display panel and the display area have a second distance therebetween, and the second distance is greater than or equal to 0.5 mm and less than or equal to 0.7 mm.

16. A display apparatus, comprising:

a backplate, the backplate including a bottom plate and a side wall;

a plastic frame, the plastic frame and the bottom plate of the backplate enclosing a cavity, the plastic frame including a support platform convexly disposed on a side wall of the plastic frame, and a surface of the support platform facing away from the bottom plate being a support surface;

at least one optical sheet, the at least one optical sheet being disposed in the cavity; and an adhesive tape, the adhesive tape including a first adhesive portion and a second adhesive portion that are arranged at an interval in a width direction of the adhesive tape, a first base and a second base; the first base including a first surface and a second surface that are arranged opposite to each other in a thickness direction thereof; the second base having a first region and a second region that are distributed at an interval in the width direction of the adhesive tape, and a portion of the second base located in the first region being lapped on the second surface of the first base; the first adhesive portion being adhered to the first surface of the first base; and the second adhesive portion being adhered to a portion of the second base located in the second region, and being located at a same surface of the second base as the first base; wherein the first adhesive portion is adhered to a surface of the at least one optical sheet facing away from the bottom plate, the second adhesive portion is adhered to the support surface of the support platform, and the second base and the surface of the at least one optical sheet facing away from the bottom plate have a second overlapping region therebetween.

17. The display apparatus according to claim 16, further comprising:

a display panel, the display panel being disposed above the support surface of the support platform and being contact with the portion of the second base lapped on the second surface of the first base facing away from the first adhesive portion.

18. The display apparatus according to claim 16, wherein the second base covers a whole of the first base, and an edge of the first base facing away from the plastic frame is flush with an edge of the second base facing away from the plastic frame;

the display apparatus further comprises: a display panel having a display area and a peripheral area disposed around the display area; wherein the first base and the second base are both light-shielding bases; and an orthogonal projection of an edge of the first base facing away from the side wall of the plastic frame on the display panel is located outside the display area, the orthogonal projection of the edge of the first base facing away from the side wall of the plastic frame on the display panel and the display area have a third distance therebetween, and the third distance is greater than or equal to 0.5 mm and less than or equal to 0.7 mm.

19. A method for assembling the display apparatus according to claim 7, the method comprising:

assembling the plastic frame and the backplate to form the cavity;

placing the at least one optical sheet in the cavity enclosed by the plastic frame and the bottom plate of the backplate; and adhering the first adhesive portion to the support surface of the support platform;

adhering the second adhesive portion to the surface of the at least one optical sheet facing away from the bottom plate;

lapping the second base on the second surface of the first base facing away from the first adhesive portion; and forming the first overlapping region between the second base and the support surface of the support platform.

20. A method for assembling the display apparatus according to claim 16, the method comprising:

assembling the plastic frame and the backplate to form the cavity;

placing the at least one optical sheet in the cavity enclosed by the plastic frame and the bottom plate of the backplate; and adhering the first adhesive portion to the surface of the at least one optical sheet facing away from the bottom plate;

adhering the second adhesive portion to the support surface of the support platform;

lapping the second base on the second surface of the first base facing away from the first adhesive portion; and forming the second overlapping region between the second base and the surface of the at least one optical sheet facing away from the bottom plate.

* * * * *